US008087578B2

(12) United States Patent
Ichikawa et al.

(10) Patent No.: US 8,087,578 B2
(45) Date of Patent: Jan. 3, 2012

(54) PRINTING DEVICE AND PRINTING SYSTEM

(75) Inventors: Yasuhisa Ichikawa, Nagoya (JP); Takeshi Watanabe, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 230 days.

(21) Appl. No.: 12/583,521

(22) Filed: Aug. 21, 2009

(65) Prior Publication Data

US 2010/0051682 A1 Mar. 4, 2010

(30) Foreign Application Priority Data

Sep. 4, 2008 (JP) ................................ 2008-226925

(51) Int. Cl.
*G06F 17/00* (2006.01)

(52) U.S. Cl. ........................................ 235/375; 235/380

(58) Field of Classification Search .................. 235/375, 235/380, 492, 462.45
See application file for complete search history.

(56) References Cited

U.S. PATENT DOCUMENTS

| | | | | |
|---|---|---|---|---|
| 7,180,627 | B2 * | 2/2007 | Moylan et al. | 358/1.6 |
| 7,675,419 | B2 * | 3/2010 | Chi | 340/572.1 |
| 7,931,205 | B2 * | 4/2011 | Blanchard et al. | 235/492 |
| 2006/0066914 | A1 | 3/2006 | Niimi et al. | |
| 2007/0018785 | A1 * | 1/2007 | Chi | 340/5.2 |
| 2009/0296140 | A1 * | 12/2009 | Sugiyama et al. | 358/1.15 |

FOREIGN PATENT DOCUMENTS

| | | |
|---|---|---|
| JP | 11180545 A | 7/1999 |
| JP | 2006100942 A | 4/2006 |

* cited by examiner

*Primary Examiner* — Daniel St.Cyr
(74) *Attorney, Agent, or Firm* — Day Pitney LLP

(57) ABSTRACT

A printer antenna configured to carry out radio communication with an RFID tag for T-shirt provided at a T-shirt to be a print target is provided, print parameter information stored in the RFID tag for T-shirt is obtained through the printer antenna, and desired printing is performed on the T-shirt using a print parameter according to the obtained print parameter information.

5 Claims, 15 Drawing Sheets

[FIG. 1]
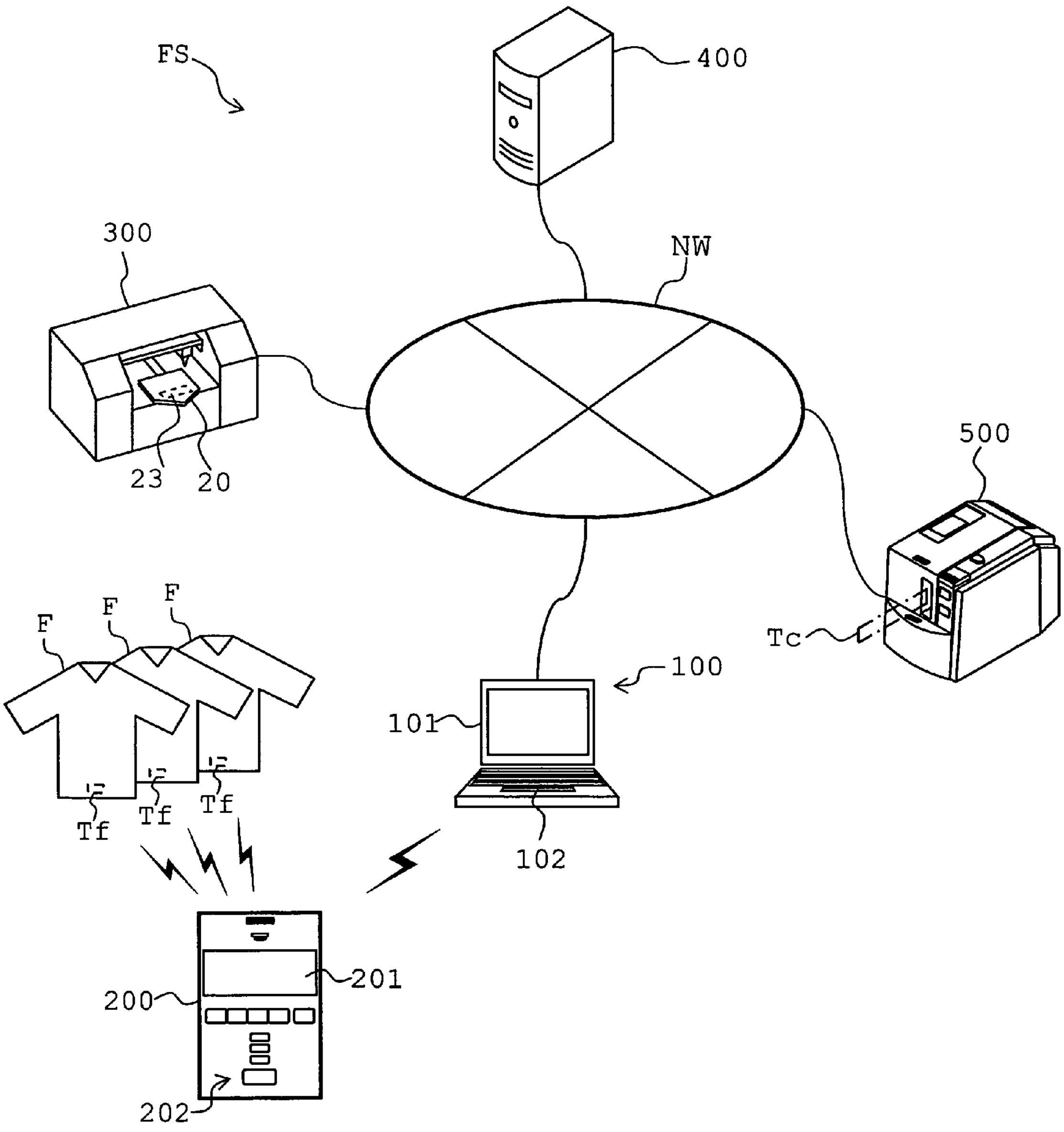

[FIG. 2]
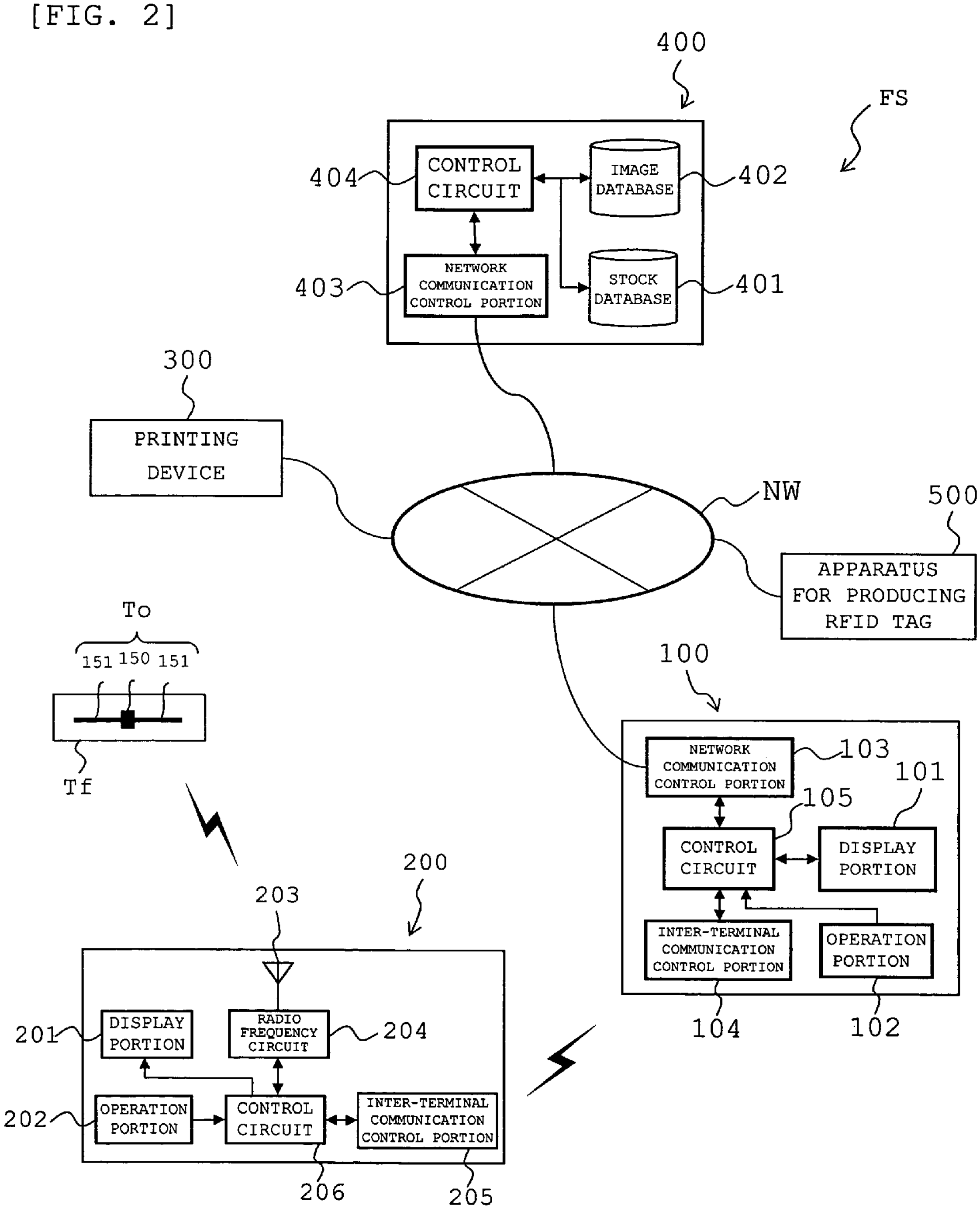

[FIG. 3]
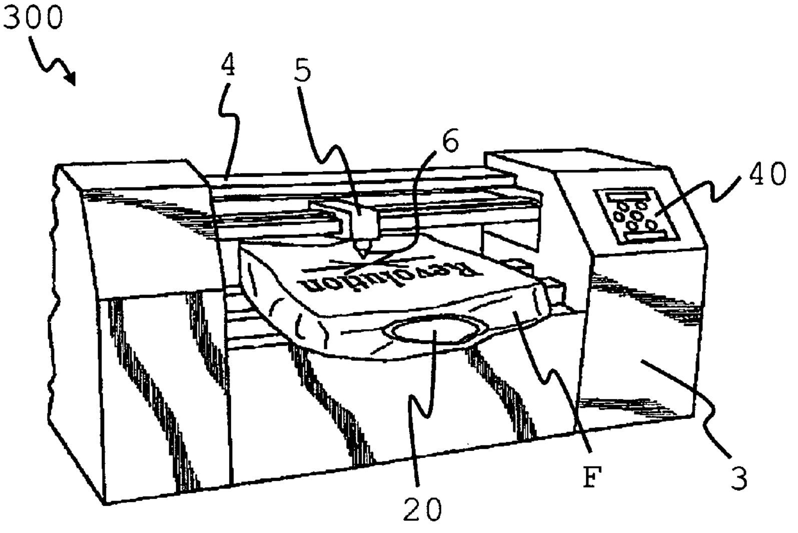
[FIG. 4]
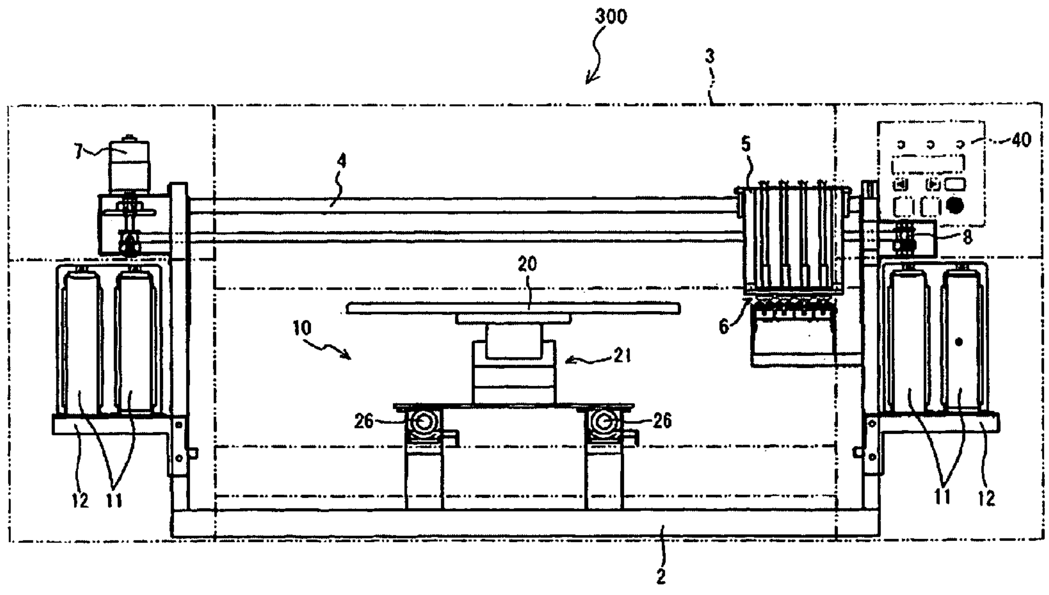

[FIG. 5]
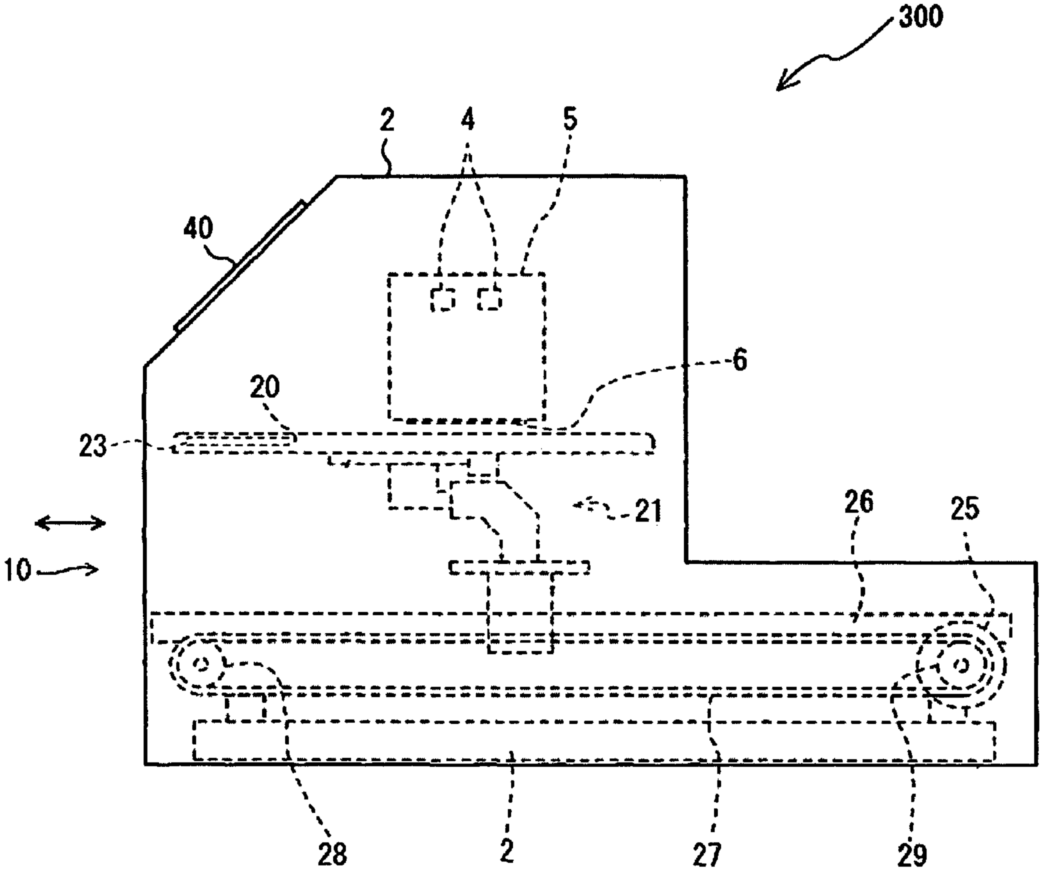

[FIG. 6]
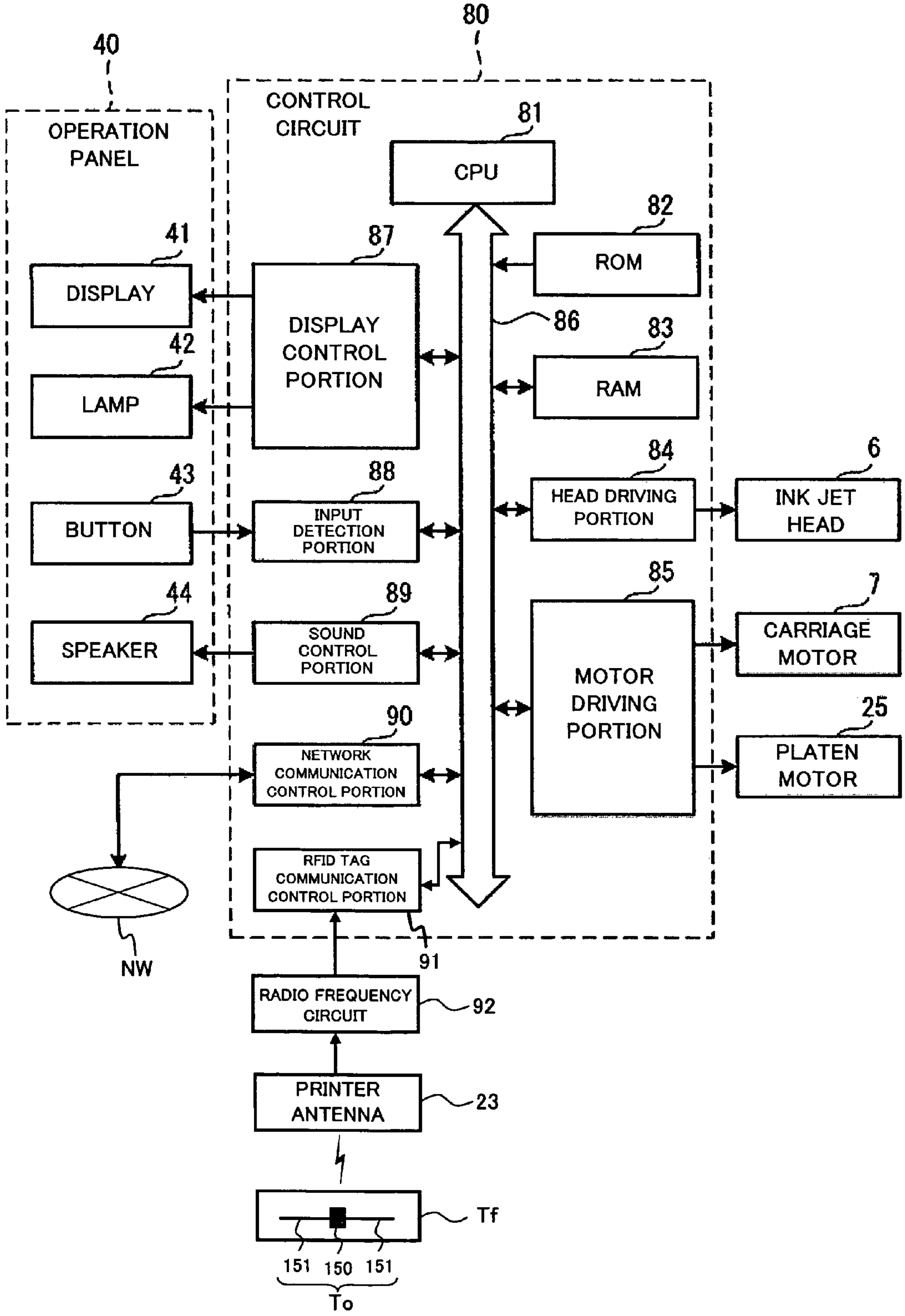

[FIG. 7]
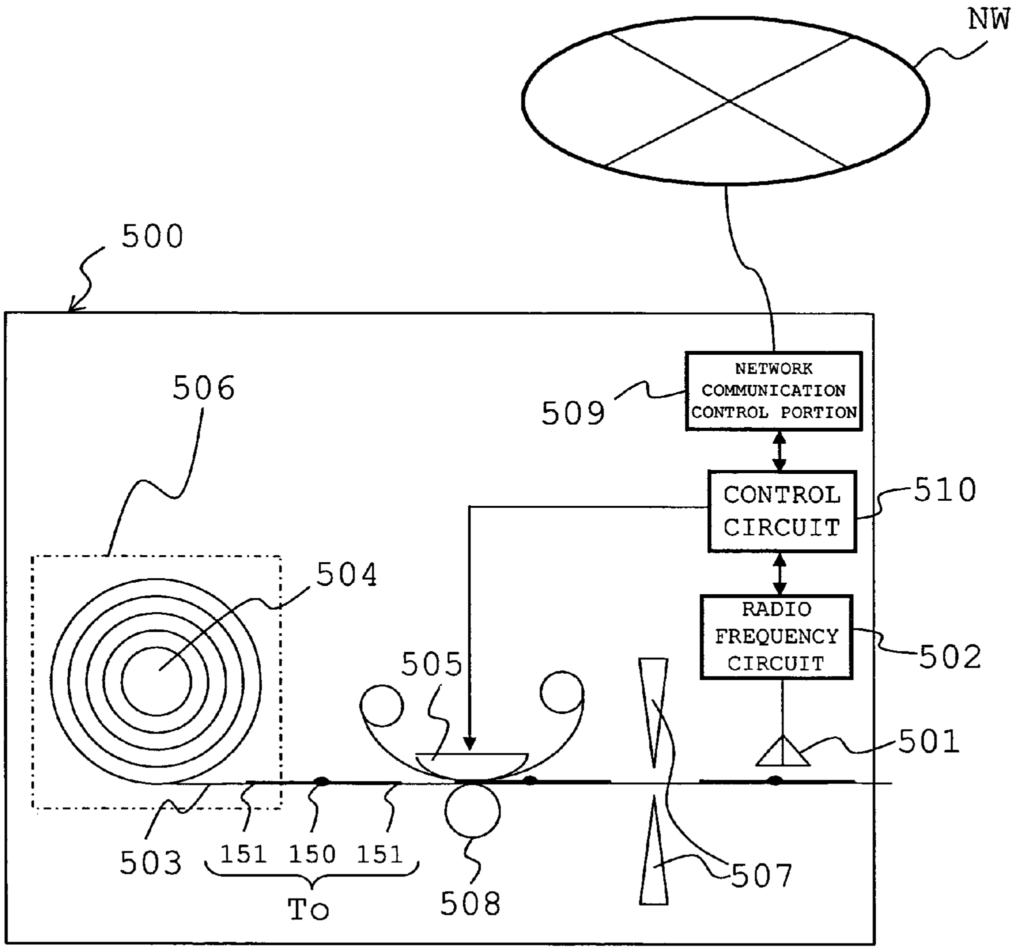

[FIG. 8]
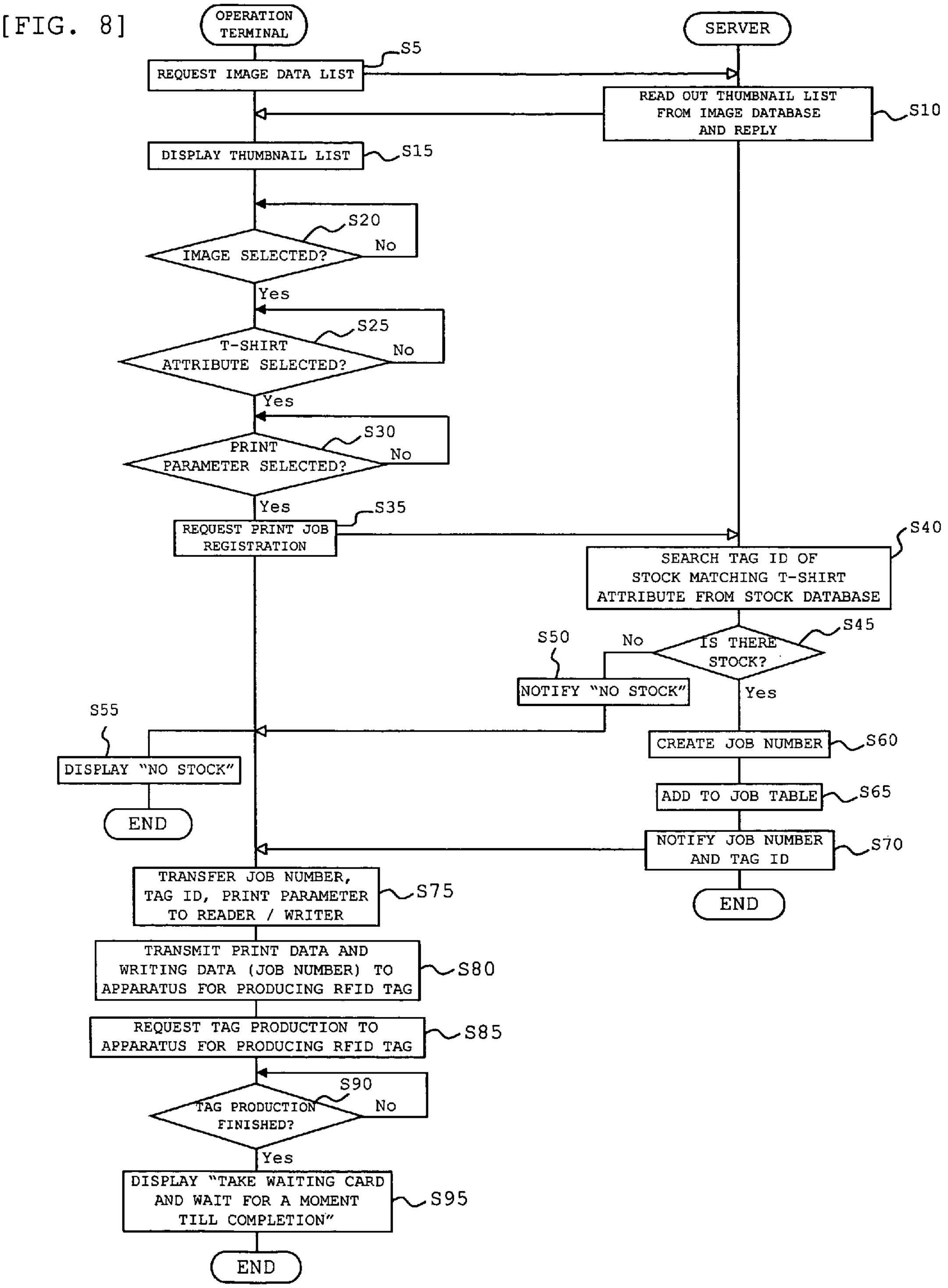

[FIG. 9]
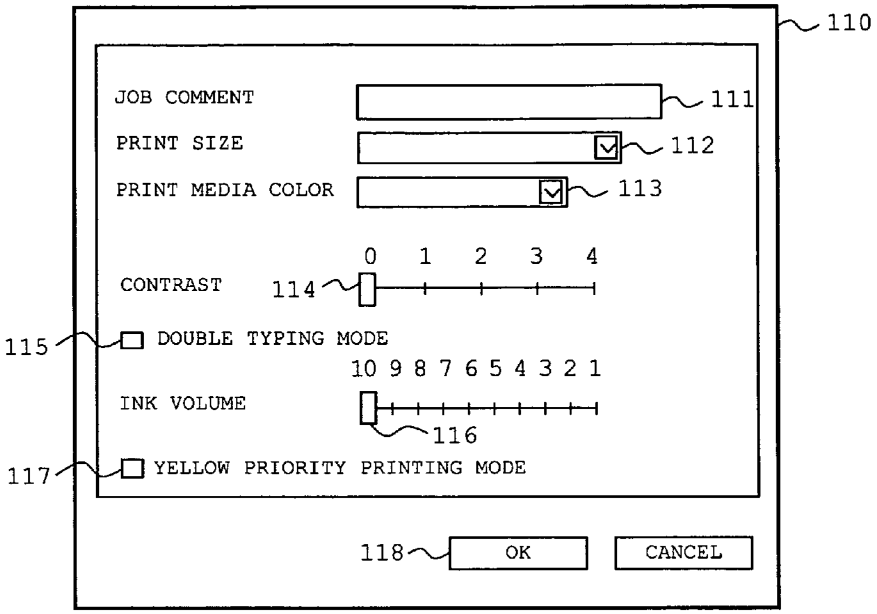
[FIG. 10]
PRINT JOB INFORMATION (IMAGE NUMBER – COLOR)
| JOB NUMBER | TAG ID | PRODUCT NUMBER | IMAGE NUMBER | SIZE | TYPE | COLOR |
|---|---|---|---|---|---|---|
| J0003747 | E0893··· | K00206 | G080949 | L | SHORT SLEEVE | WHITE |

[FIG. 11]
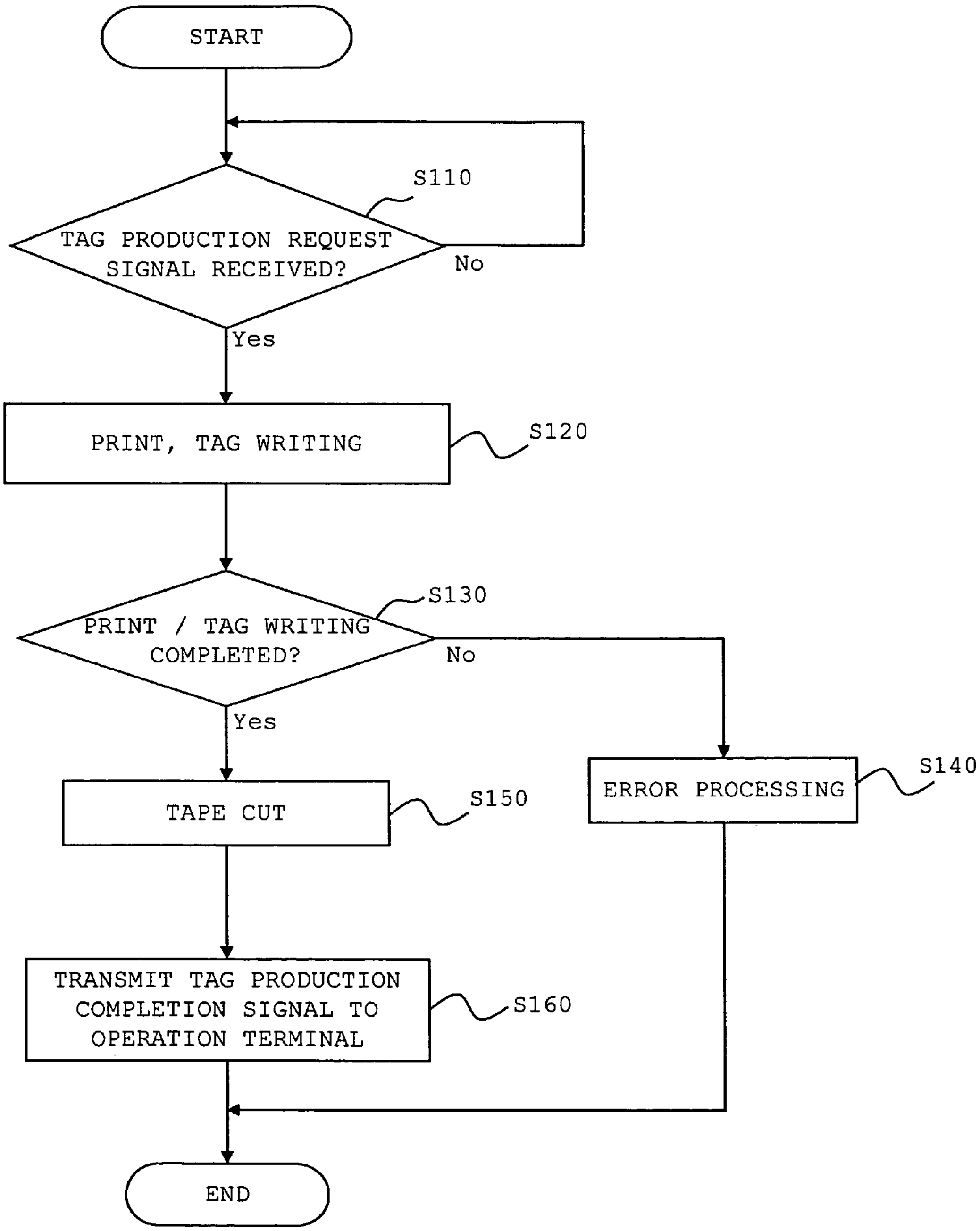

[FIG. 12]
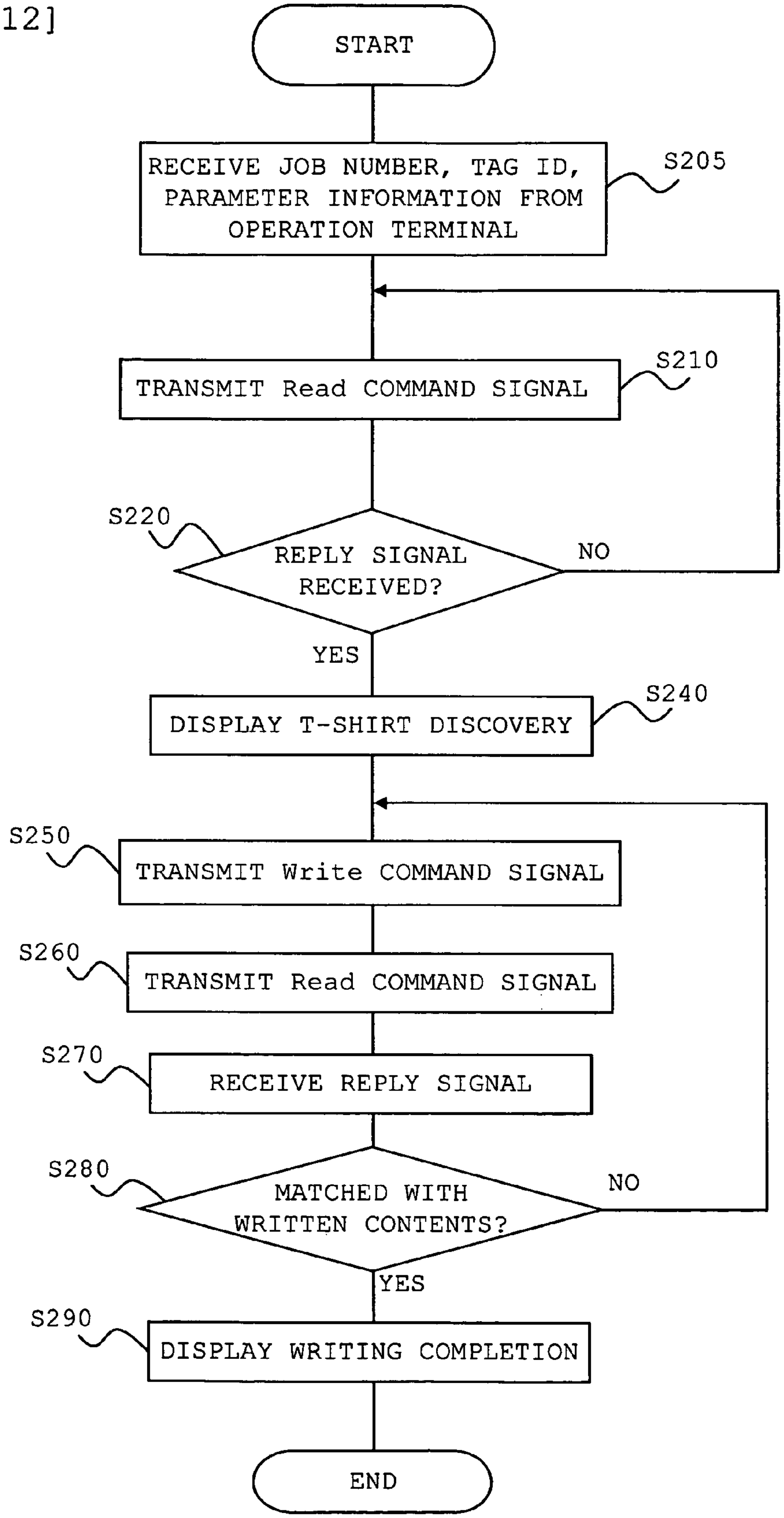

[FIG. 13]
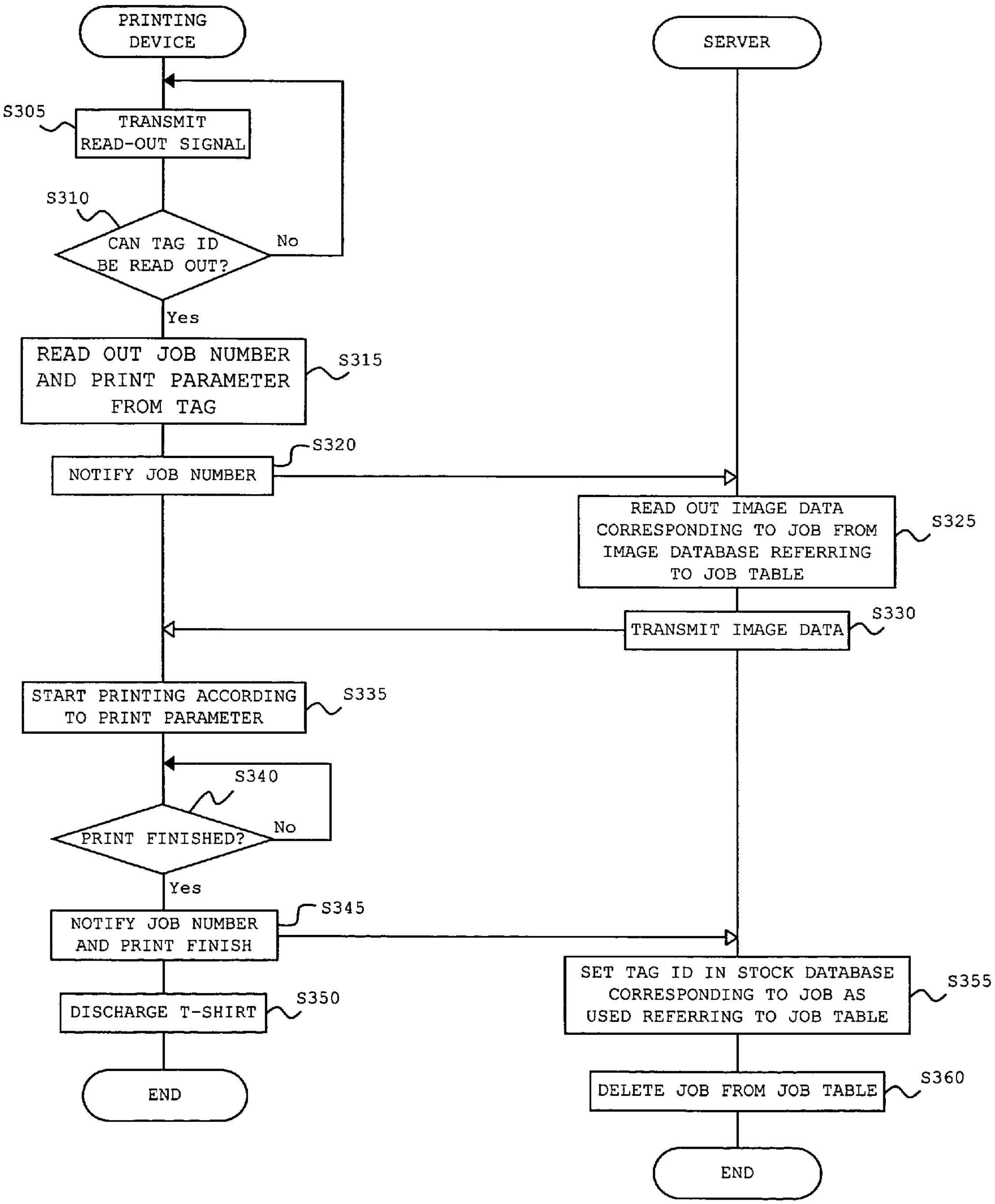

[FIG. 14]
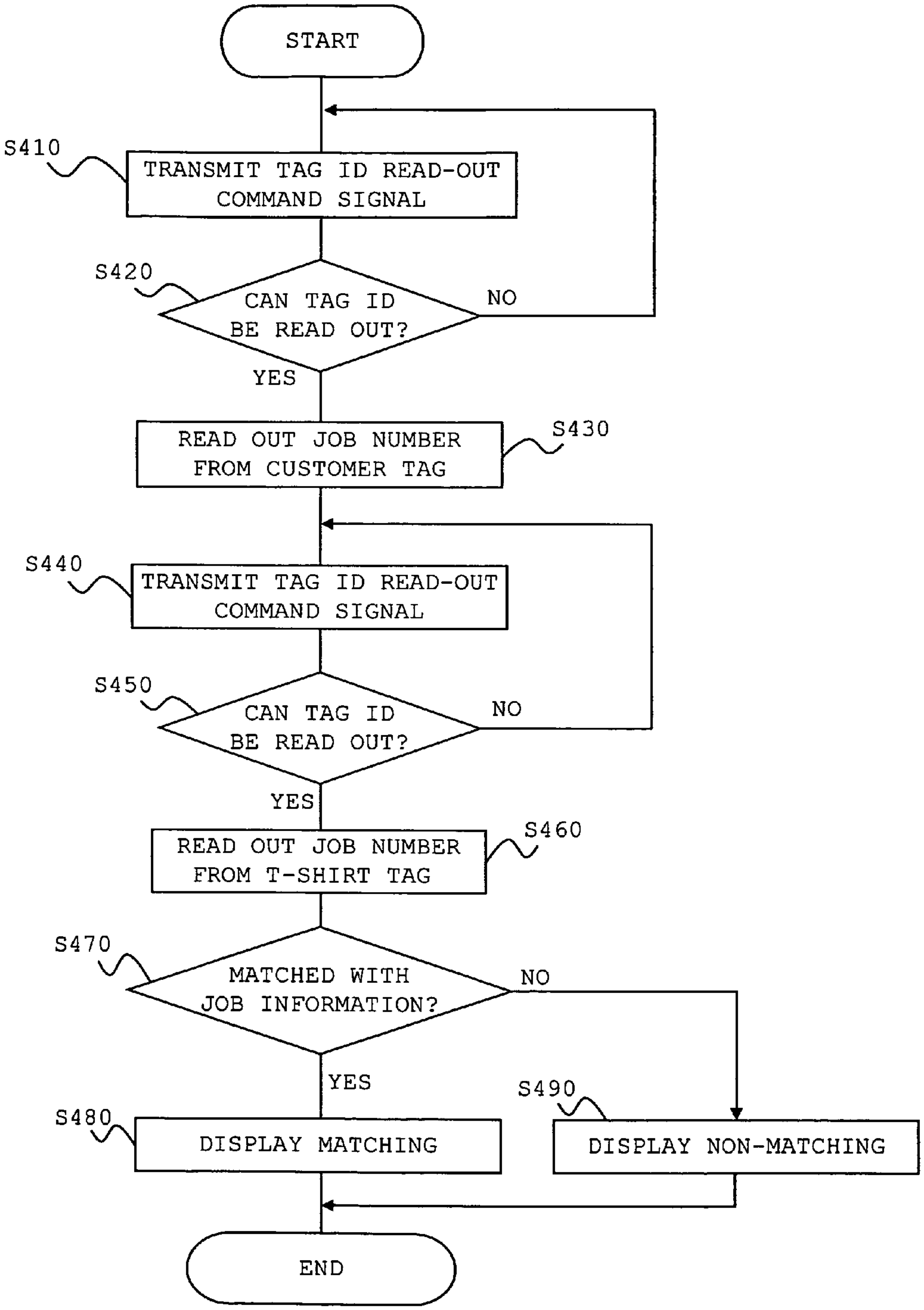

[FIG. 15]
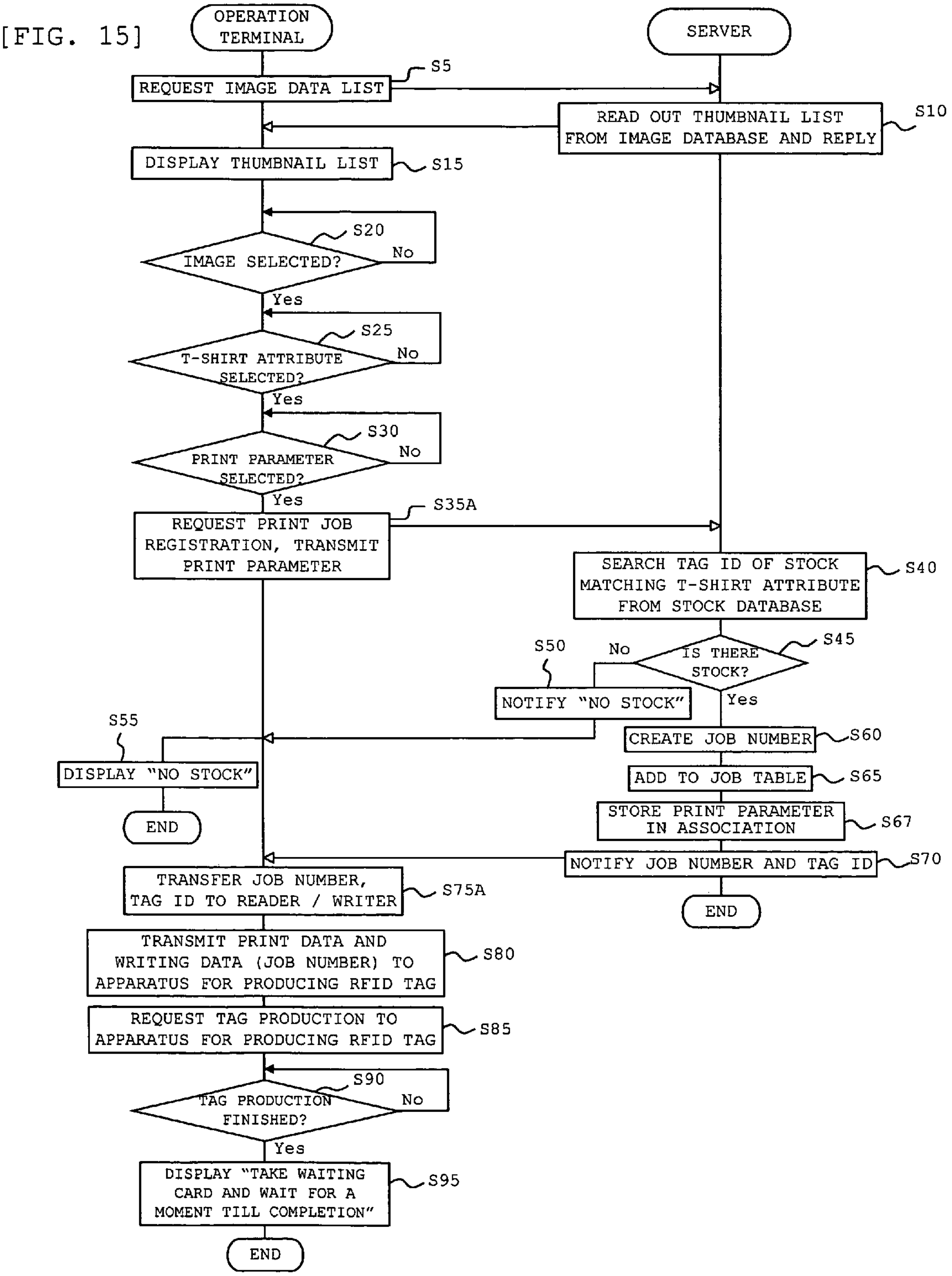

[FIG. 16]

PRINT JOB INFORMATION (IMAGE NUMBER, SIZE, TYPE, COLOR)

| JOB NUMBER | TAG ID | PRODUCT NUMBER | IMAGE NUMBER | SIZE | TYPE | COLOR | PRINT PARAMETER |
|---|---|---|---|---|---|---|---|
| 0003747 | E0893··· | K00206 | G080949 | L | SHORT SLEEVE | WHITE | PRINT SIZE AND THE LIKE |

[FIG. 17]
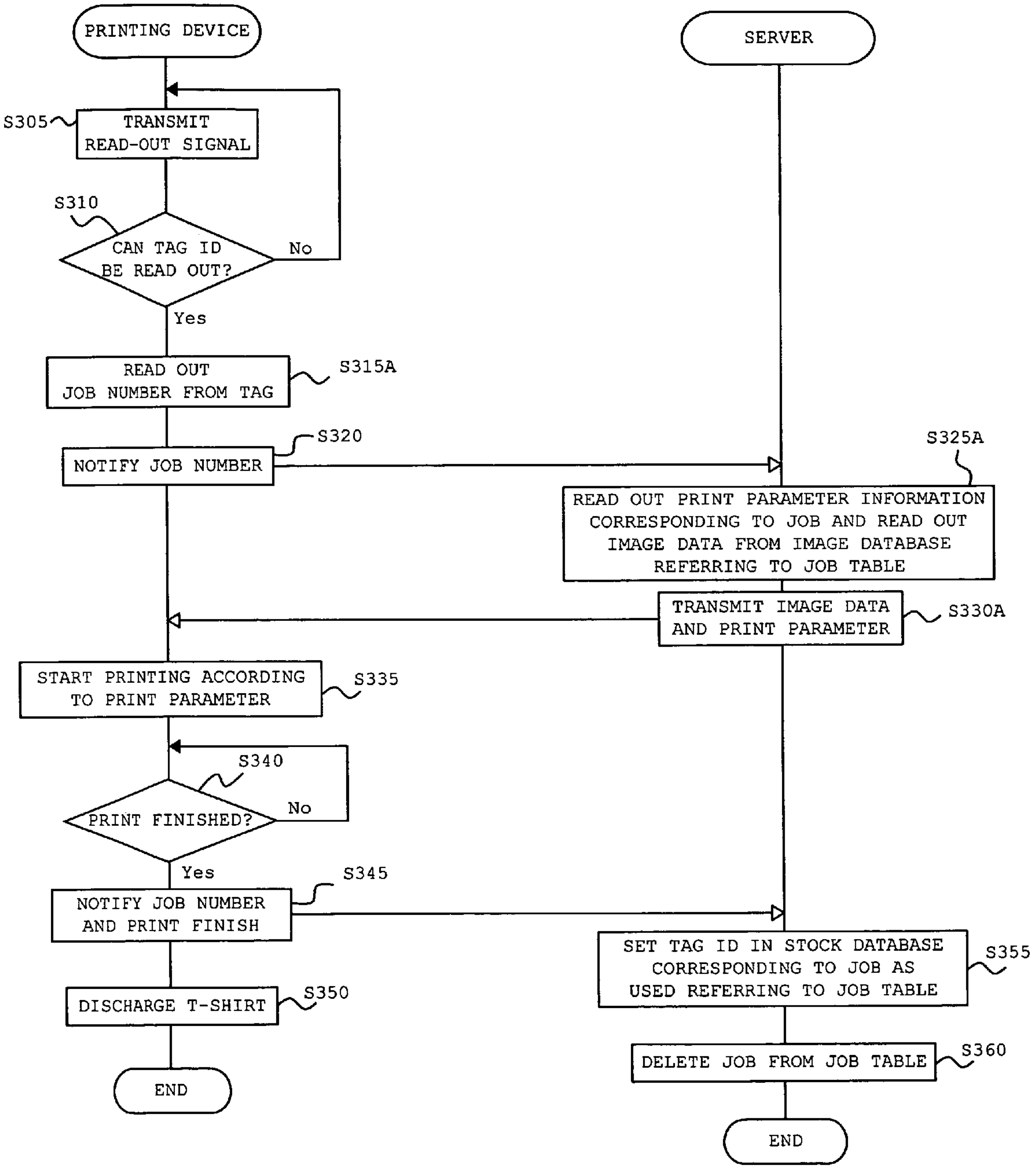

PRINTING DEVICE AND PRINTING SYSTEM

CROSS-REFERENCE TO RELATED APPLICATIONS

This application claims priority from JP 2008-226925, filed Sep. 4, 2008, the contents of which are hereby incorporated by reference.

BACKGROUND OF THE INVENTION

1. Field of the Invention

The present invention relates to a printing device and a printing system configured to perform printing desired by a customer on a print target in response to an order from a customer.

2. Description of the Related Art

A printing device configured to perform desired printing on a print target such as a T-shirt has been known such as JP, A, 2006-100942, for example. This printing device includes a print head configured to discharge ink to a platen on a plane holding a print target and a carriage configured to feed the print head and executes printing on the print target by moving the platen in a sub scan direction and by moving the carriage in a main scan direction.

In the meantime, a Radio Frequency Identification (RFID) system configured to carry out information reading and writing contactlessly between an RFID tag and a reader/writer as a reading device and a writing device has been put into practice in various fields in the recent years. Prior art references in which the RFID system is applied to an identifying device of a print target such as clothes include the one described in JP, A, H11-180545. In this prior art reference, an RFID tag as a data carrier is provided at a print target as clothes, and automatic identification of the print target is realized by information reading by the reader from the RFID tag.

A printing system which completes a printed product by selecting a print target corresponding to an order of a customer from among a plurality of print targets and performing desired printing corresponding to the order of the customer using the prior-art printing device will be considered. In this case, in order to produce a printed product efficiently, the prior art reference described in JP, A, H11-180545 is applied to the prior art reference described in JP, A, 2006-100942 and information reading is carried out by a reader from an RFID tag provided at the print target so that the print target corresponding to the order of the customer is automatically identified from among the plurality of print targets and can be easily selected.

However, in this case, selection of the print target can be made easily, when printing is to be performed by a printing device subsequently, reading of print information corresponding to the order of the customer and setting of print parameters need to be executed, and there is a room for further efficiency. Also, in this case, since the RFID tag is used as an information medium only in a selection scene of the print target, it was not possible to collectively manage a course from selection of the print target to printing on the print target in a centralized manner.

SUMMARY OF THE INVENTION

The present invention has an object to provide a printing device and a printing system that can perform printing on a print target according to order content of a customer reliably and efficiently and can collectively manage a course from selection of the print target to printing on the print target in a centralized manner by utilizing an RFID tag as an information medium.

BRIEF DESCRIPTION OF THE DRAWING

FIG. 1 is a system configuration diagram illustrating an entire configuration of a printing system of this embodiment.

FIG. 2 is a functional block diagram conceptually illustrating a functional configuration of an entire system of the printing system.

FIG. 3 is a perspective view illustrating an entire structure of a printing device.

FIG. 4 is a front view illustrating the entire structure of the printing device.

FIG. 5 is a side view illustrating the entire structure of the printing device.

FIG. 6 is a functional block diagram illustrating an electric configuration of the printing device.

FIG. 7 is a functional block diagram illustrating a functional configuration of an apparatus for producing an RFID tag.

FIG. 8 is a flowchart illustrating control contents executed by a control circuit of an operation terminal and a control circuit of a server.

FIG. 9 is a view illustrating an example of a selection input screen of print parameters displayed on a display portion of the operation terminal.

FIG. 10 conceptually illustrates a job table registered in a stock database by the control circuit of the server.

FIG. 11 is a flowchart illustrating a control procedure executed by a control circuit of the apparatus for producing an RFID tag when the RFID tag for customer is to be produced.

FIG. 12 is a flowchart illustrating a control procedure executed by a control circuit of the reader/writer when an operator searches a T-shirt.

FIG. 13 is a flowchart illustrating control contents executed by a control circuit of the printing device and the control circuit of the server.

FIG. 14 is a flowchart illustrating a control procedure executed by the control circuit of the reader/writer when a printed T-shirt is delivered to the customer.

FIG. 15 is a flowchart illustrating control contents executed by the control circuit of the operation terminal and the control circuit of the server in a variation in which the print parameters are not written in the tag.

FIG. 16 conceptually illustrates a job table registered in the stock database by the control circuit of the server in the variation in which the print parameters are not written in the tag.

FIG. 17 is a flowchart illustrating control contents executed by the control circuit of the printing device and the control circuit of the server in the variation in which the print parameters are not written in the tag.

DETAILED DESCRIPTION OF THE PREFERRED EMBODIMENTS

An embodiment of the present invention will be described below referring to the attached drawings.

FIG. 1 is a system configuration diagram illustrating an entire configuration of a printing system of this embodiment.

In FIG. 1, a printing system FS selects a T-shirt F, that is a T-shirt before printing, as a print target according to an order from a customer, performs printing desired by the customer on a selected T-shirt F and sells a printed T-shirt as a complete product to the customer. The printing system FS comprises at least one RFID tag Tf for T-shirt as an RFID tag for print target, an operation terminal 100, a reader/writer 200, a printing device 300, a server 400, and an apparatus 500 for producing an RFID tag. The RFID tag Tf has an RFID tag circuit element To provided respectively for at least one T-shirt F to become a print target. The RFID tag circuit element To has an IC circuit part 150 storing predetermined information and a tag antenna 151 for information transmission and reception. On the other hand, the RFID tag Tf may be installed at a hanger over which the T-shirt F is hung, though the RFID tag is directly attached to the T-shirt F in this embodiment. The operation terminal 100 is such as a PC and has a display portion 101, and an operation portion 102. An operator can operate to input order information for a T-shirt through the operation portion 102 by using the operation terminal. The reader/writer 200 is connected to the operation terminal 100 via inter-terminal radio communication such as Bluetooth (registered trademark). The reader/writer 200 is capable of information input and output and capable of information writing and reading with respect to the RFID tag Tf for T-shirt. The printing device 300 performs desired printing on the T-shirt F. The server 400 has a stock database 401 and an image database 402 (See FIG. 2, which will be described later). The stock database 401 stores attributes of the T-shirt F and a tag ID as tag identification information of the RFID tag Tf for T-shirt corresponding to the T-shirt F in association with each other. The attributes includes size, type, and color. The image database 402 stores image data as image information to be printed on the T-shirt F. The apparatus 500 for producing an RFID tag configured to produce an RFID tag Tc for customer used as a coupon when the customer redeems it for the printed T-shirt F on the basis of an operation input of the operation terminal 100. The operation terminal 100, the printing device 300, the server 400, and the apparatus 500 for producing an RFID tag are connected through a wired or wireless network NW capable of information input and output. The wireless network NW is such as LAN or wireless LAN.

The RFID tag Tf for T-shirt is provided on a back side of a hem portion of the T-shirt F. As a result, when the T-shirt F is attached to a platen 20 of the printing device 300 from the hem portion, it can be brought close to a printer antenna 23 provided at the platen 20 for favorable radio communication. The RFID tag Tf for T-shirt may be provided at a spot, such as a collar portion of the T-shirt, other than the hem portion as long as radio communication with the printer antenna 23 can be conducted favorably.

FIG. 2 is a functional block diagram conceptually illustrating a functional configuration of the entire system of the printing system FS.

In FIG. 2, the operation terminal 100 has the display portion 101, the operation portion 102, a network communication control portion 103, an inter-terminal communication control portion 104, and a control circuit 105. The display portion 101 displays various operation screens and input screens. The operation portion 102 comprises such as appropriate buttons, keys, and a mouse for operation input by an operator. The network communication control portion 103 controls network communication made among the printing device 300, the server 400, and the apparatus 500 for producing an RFID tag through the network NW. The inter-terminal communication control portion 104 controls inter-terminal radio communication with the reader/writer 200. The control circuit 105 controls an operation of the entire operation terminal 100 including the display portion 101, the network communication control portion 103, and the inter-terminal communication control portion 104.

The reader/writer 200 as an apparatus for communicating with an RFID tag has a display portion 201, an operation portion 202, a reader antenna 203, a radio frequency circuit 204, an inter-terminal communication control portion 205, and a control circuit 206. The display portion 201 makes various displays. The operation portion 202 makes various operation inputs. The reader antenna 203 conducts signal transmission and reception with the RFID tag circuit element To of the RFID tag Tf for T-shirt via radio communication. The radio frequency circuit 204 makes an access to the IC circuit part 150 of the RFID tag circuit element To through the reader antenna 203 via radio communication and to process a signal read from the RFID tag circuit element To. The inter-terminal communication control portion 205 controls inter-terminal radio communication made with the operation terminal 100. The control circuit 206 controls the entire reader/writer 200 including the display portion 201, the radio frequency circuit 204, and the inter-terminal communication control portion 205.

The radio frequency circuit 204 is to access information of the IC circuit part 150 of the RFID tag circuit element To in the RFID tag Tf for T-shirt through the reader antenna 203, and the control circuit 206 of the reader/writer 200 is to process a signal read from the IC circuit part 150 of the RFID tag circuit element To of the RFID tag Tf for T-shirt so as to read information and to create various commands in order to make an access to the IC circuit part 150 of the RFID tag circuit element To.

The server 400 has the stock database 401 as a database, the image database 402, a network communication control portion 403, and a control circuit 404. The network communication control portion 403 controls network communication made between the operation terminal 100 and the printing device 300 through the network NW. The control circuit 404 is connected to the databases 401, 402 capable of information input and output and configured to control the entire server 400.

FIG. 3 is a perspective view illustrating an entire structure of the printing device 300, and FIG. 4 is a front view thereof and FIG. 5 is a side view thereof. A front side direction on a paper in FIGS. 3 and 4 and a left direction in FIG. 5 are a front direction of the printing device 300, and an upper direction in FIGS. 3 to 5 is an upper direction of the printing device 300.

In FIGS. 3 to 5, the printing device 300 is an ink-jet type printer configured to apply print on a T-shirt to be a print target. Incidentally, in this embodiment, the print target is a T-shirt, but other than the T-shirt, clothes such as a jacket, socks, cloth products such as a handkerchief, towel, pillow case, and cushion cover may be a print target. The printing device 300 has a frame 2, a casing 3, a guide rail 4, a carriage 5, a plurality of ink jet heads 6, a carriage motor 7, a platen driving mechanism 10, a cartridge container portion 12, and an operation panel 40. The casing 3 is provided so as to cover the frame 2. The casing 3 is shown by a two-dotted chain line in order to avoid complexity. The guide rail 4 is horizontally extended so as to connect an upper part of the frame 2. The carriage 5 is substantially in a cubic shape and has the moving direction guided by the guide rail 4 in its longitudinal direction. Four of the ink jet heads 6 is provided in the example on a bottom face of the carriage 5. The carriage motor 7 is provided in the vicinity of a left end of the guide rail 4. The platen driving mechanism 10 is provided in the frame 2. The cartridge container portion 12 is provided on right and left side faces of the printing device 300 and configured to detachably contain an ink cartridge 11 containing each ink. The operation panel 40 is provided at an upper part on a right side of the casing 3 and configured to operate the printing device 300.

The ink jet head 6 is provided corresponding to each of four color inks of cyan, magenta, yellow and black, for example, and controlled so that ink droplets are injected downward from a micro injection nozzle (not shown) drilled in a bottom face of each ink jet head 6.

Each cartridge container portion 12 can have two ink cartridges 11 attached, respectively. The ink cartridge 11 and the ink jet head 6 are connected to each other by a tube (not shown) so that ink is supplied to each ink jet head 6 from each ink cartridge 11.

The platen driving mechanism 10 is provided with the platen 20, endless belts 27, 27 wound around pulleys 28, 29 provided front and rear of the frame 2, platen rails 26, 26 provided above the endless belts 27, 27, respectively, the platen 20 supported above the platen rails 26, 26 through a support 21, and a platen motor 25 provided at the rear pulley 29.

The platen 20 is, in this example, to apply print on a corsage, that is, front corsage or rear corsage, of the T-shirt F, which is a T-shirt and is provided with a substantially pentagonal plate shape so that a face opposite the ink jet head 6 is a plane parallel with a path on which the ink jet head 6 reciprocally moves. When the platen motor 25 drives the endless belt 27 through the pulley 29, the platen 20 reciprocally moves in a longitudinal direction of the printing device 300 (perpendicular direction to a paper in FIG. 4 and lateral direction in FIG. 5) along the platen rail 26 through the support 21. Here, as described above, the ink jet head 6 is mounted on the carriage 5 and reciprocally moves in a lateral direction of the printing device 300 (lateral direction in FIG. 4) along the guide rail 4 by the driving of the carriage motor 7. As a result, in printing, the ink jet head is relatively and freely moved in longitudinal and lateral directions with respect to the T-shirt F by the platen 20 moving in a longitudinal direction and the ink jet head 6 moving in a lateral direction so that desired printing can be performed at a desired position.

Also, on a front side of the platen 20, the printer antenna 23 that conducts radio communication with the RFID tag Tf for T-shirt associated with the T-shirt F is provided (See FIGS. 1 and 5). As a result, as described above, when the T-shirt F is attached to the platen 20, information can be read from the RFID tag Tf for T-shirt provided at the T-shirt F.

FIG. 6 is a functional block diagram illustrating an electrical configuration of the printing device 300.

In FIG. 6, the printing device 300 is provided with, as an configuration according to its electric control, in addition to the above-described operation panel 40, a control circuit 80 and a radio frequency circuit 92 configured to make an access to the IC circuit part 150 of the RFID tag circuit element To of the RFID tag Tf for T-shirt through the printer antenna 23 via radio communication and process a signal read from the RFID tag circuit element To.

The control circuit 80 has a CPU 81, a ROM 82, a RAM 83, a head driving portion 84, a motor driving portion 85, a display control portion 87, an input detection portion 88, a sound control portion 89, a network communication control portion 90, and an RFID tag communication control portion 91, and thus they are connected through a bus 86. The CPU 81 governs control of the entire printing device 300. The ROM 82 stores various control programs executed by the CPU 81. The RAM 83 temporarily stores data. The head driving portion 84 drives a piezoelectric actuator (not shown) provided at the ink jet head 6. The motor driving portion 85 drives the carriage motor 7 and the platen motor 25. The display control portion 87 executes display control of a display 41 and a lamp 42 provided at the operation panel 40. The input detection portion 88 receives an input of various buttons 43 provided at the operation panel. The sound control portion 89 controls sound output of a speaker 44 provided at the operation panel. The network communication control portion 90 executes control of network communication made with the operation terminal 100 and the server 400 through the network NW. The RFID tag communication control portion 91 executes radio communication control with the RFID tag Tf for T-shirt carried out to obtain a job number and print parameter information (details will be described later) stored in the IC circuit part 150 of the RFID tag circuit element To in the RFID tag Tf for T-shirt.

FIG. 7 is a functional block diagram illustrating a functional configuration of the apparatus 500 for producing an RFID tag.

In FIG. 7, the apparatus 500 for producing an RFID tag is provided with a function to produce an RFID tag Tc for customer used as a coupon when the customer redeems it for a completed printed T-shirt F as described above. That is, the apparatus 500 for producing an RFID tag has a cartridge holder 506, a print head 505, a feeding roller 508 as a feeding device, an apparatus antenna 501, a radio frequency circuit 502, a cutter 507, a network communication control portion 509, and a control circuit 510. A cartridge (not shown) can be detachably attached to the cartridge holder 506. The cartridge includes a roll 504 of a tape with RFID tags. A tag tape 503 as tag medium is wound around and forms the roll 504. Actually, the tag tape 503 is wound in the spiral state but is simplified and shown with a concentric circle. RFID tag circuit elements To are provided with a predetermined interval on the tag tape 503. The print head 505 performs desired printing on a area corresponding to each RFID tag circuit element To in the tag tape 503 fed out of the roll 504 of a tape with RFID tags. The feeding roller 508 feeds the tag tape 503. The apparatus antenna 501 and the radio frequency circuit 502 carry out information transmission and reception via radio communication with the RFID tag circuit element To provided at the tag tape 503 so as to write RFID tag information. The cutter 507 cuts the tag tape 503 for which print on the tag tape 503 and information writing in the RFID tag circuit element To have been finished to a predetermined length to produce the above-described RFID tag Tc for customer. The network communication control portion 509 carries out control of the network communication made with the operation terminal 100 through the network NW. The control circuit 510 carries out operation control of the entire apparatus 500 for producing an RFID tag including the radio frequency circuit 502, the print head 505, the cutter 507, the feeding roller 508, and the network communication control portion 509.

Note that, though not described in the above, the radio frequency circuit 92 of the printing device 300 and the radio frequency circuit 502 of the apparatus 500 for producing an RFID tag also have a configuration similar to that of the radio frequency circuit 204 of the reader/writer 200.

In the printing system FS with the above configuration, a printed T-shirt F is produced with a following procedure. That is, when a customer comes to a shop, an operator receives an order of a customer and inputs order information such as image number to be printed, T-shirt attribute, print parameter, at the operation terminal 100 according to order contents. The operator is sales representative. Or the operator may be a customer himself or herself. Then, at the operation terminal 100, print job information is created. The print job information includes selected image number and print target information. Thus, a registration request of a print job is transmitted with the print job information to the server 400 from the operation terminal 100 through the network NW. The order information is information directly input by the customer at the operation terminal 100, and the print job information is information in a telegraph format created at the operation terminal 100 on the basis of the input order information to be transmitted to the server 400 from the operation terminal 100. In the server 400, search is made to see if there is a stock of a T-shirt F before print matching the received print target information or not. Thus, if there is a stock, a corresponding job number is created, and the job number, a product number of the corresponding T-shirt F, a tag ID of the corresponding RFID tag Tf for T-shirt, and print job information are registered in a job table of the stock database 401 or may be the image database 402. Then, the registered job number and the tag ID are transmitted to the operation terminal 100 from the server 400 through the network NW.

Subsequently, the job number and the tag ID received from the server 400 and print parameter information input by the operator are transmitted to the reader/writer 200 from the operation terminal 100 via inter-terminal radio communication, and the job number and appropriate print data are transmitted to the apparatus 500 for producing an RFID tag from the operation terminal 100 through the network NW. As a result, in the apparatus 500 for producing an RFID tag, the job number is written in the RFID tag circuit element To, and the RFID tag Tc for customer on which an appropriate print is applied on the basis of the print data is produced. The RFID tag Tc for customer is delivered to the customer. On the other hand, the operator searches a T-shirt F matching the print target information input by the customer from among a plurality of T-shirts F prepared as a stock in a warehouse using the reader/writer 200. The reader/writer 200 accesses the RFID tag Tf for T-shirt provided at each T-shirt F via radio communication, determines if the tag ID received from the operation terminal 100 matches the obtained tag ID or not and detects the T-shirt F matching the print target information, and writes the job number and the print parameter information in the RFID tag Tf for T-shirt.

The operator sets the T-shirt F found using the reader/writer 200 on the platen 20 of the printing device 300. At this time, the job number and the print parameter information are read from the RFID tag Tf for T-shirt provided at the T-shirt F through the printer antenna 23 provided to the platen 20. When the read job number is transmitted to the server 400 from the printing device 300 through the network NW, the server 400 reads out image data corresponding to the job number from the image database 402 and transmits it to the printing device 300 through the network NW. At the printing device 300, on the basis of the print parameter information obtained from the RFID tag Tf for T-shirt, printing of the image data received from the server 400 is executed. As a result, the printed T-shirt F is completed. The printing by the printing device 300 is executed by moving the platen 20 to a desired print start position after the operator sets the T-shirt F on the platen 20. The platen 20 is moved automatically or by means of manual operation.

If the customer picks up the printed T-shirt F, information reading is carried out from the RFID tag Tc for customer held by the customer and the RFID tag Tf for T-shirt provided at the T-shirt F using the reader/writer 200 or another reader. As a result, if the job numbers read from the both match each other, it is regarded as the printed T-shirt F ordered by the customer, and the printed T-shirt F is delivered.

Subsequently, in a production procedure of the printed T-shirt F, control contents executed by each device of the printing system FS will be described using FIGS. 10 to 15.

FIG. 8 is a flowchart illustrating control contents executed by the control circuit 105 of the operation terminal 100 and the control circuit 404 of the server 400.

When the operator carries out an input start operation of order information to a desired printed T-shirt F at the operation terminal 100, as shown at Step S5, the control circuit 105 of the operation terminal 100 transmits a request signal requesting a thumbnail list of image data to the server 400 through the network communication control portion 103 and the network NW. The thumbnail list is a list of size-reduced images for displaying a list of a large number of images.

The control circuit 404 of the server 400 having received a request signal reads out thumbnail list data of plural image data stored in the image database 402 as shown at Step S10. The thumbnail list data is created and stored in advance. Thus, the control circuit 404 transmits the thumbnail list data to the operation terminal 100 through the network communication control portion 403 and the network NW.

The control circuit 105 of the operation terminal 100 having received a thumbnail list data outputs a display signal to the display portion 101 so as to display the thumbnail list as shown at Step S15.

After that, the control circuit 105 of the operation terminal 100 determines if a desired image has been selected by the operator from the thumbnail list on the basis of an input signal from the operation portion 102 as shown at Step S20. This step is repeated till the image is selected, and if the image is selected, the determination is satisfied, and the routine goes to Step S25. At this time, the control circuit 105 creates image number information that identifies the selected image.

At Step S25, the control circuit 105 of the operation terminal 100 displays a selection input screen of attributes of the T-shirt F on the display portion 101, and the operator determines if the attribute of the T-shirt F has been input or not on the basis of the input signal from the operation portion 102 referring to a screen. In this embodiment, the operator selects and inputs a size, color, type of the T-shirt as the attribute of the T-shirt F. The size is L, M, or S, for example. The type is long sleeve, short sleeve, French sleeve, tank top, or raglan sleeve, for example. This step is repeated till the attribute is input, and if the attribute is input, the determination is satisfied, and the routine goes to Step S30. At this time, the control circuit 105 creates the print target information corresponding to the input attribute.

At Step S30, the control circuit 105 of the operation terminal 100 displays the selection input screen (See FIG. 9, which will be described later) of the print parameter on the display portion 101, and the operator determines if the print parameter has been input or not on the basis of the input signal from the operation portion 102 referring to the screen. In this embodiment, the operator selects and inputs print size, color of the T-shirt, and contrast as the print parameter. This step is repeated till the print parameter is input, and if the print parameter is input, the determination is satisfied, and the routine goes to Step S35. At this time, the control circuit 105 creates the print parameter information corresponding to the input print parameter.

At Step S35, the control circuit 105 of the operation terminal 100 creates print job information included by the image number information created at Step S20 and the print target information created at Step S25 and transmits the print job information and a request signal requesting registration of the print job to the server 400 through the network communication control portion 103 and the network NW.

The control circuit 404 of the server 400 having received the request signal and the print job information as image number information and print target information searches the T-shirt F before print matching the received print target information in the stock database 401 as shown at Step S40.

At Step S45, the control circuit 404 of the server 400 determines if there is a T-shirt F matching the received print target information as the result of the search. The determination includes, when the operator orders a plurality of T-shirts F, for example, determination if there is the plurality of T-shirts F matching the print target information if. If there is no stock, the determination is not satisfied and the routine goes to Step S50, where a notification signal that notifies "no stock" is transmitted to the operation terminal 100 through the network communication control portion 403 and the network NW.

The control circuit 105 of the operation terminal 100 having received the notification signal outputs a display signal to the display portion 101 so as to make a display such as "no stock" to notify that there is no T-shirt F matching the attribute input by the operator. Then, this flow is finished.

On the other hand, at Step S45, if the control circuit 404 of the server 400 determines that there is a T-shirt F matching the received print target information, the determination is satisfied and the routine goes to Step S60, where the job number as job identification information corresponding to the order is created. Then, at Step S65, the job number created in association with the print job information received from the operation terminal 100 is given to a product number as product identification information that identifies the T-shirt F matching the attribute, and it is registered in a job table stored in the stock database 401 together with the tag ID corresponding to the T-shirt F matching the attribute. As described above, the tag ID is stored in the stock database 401 in association with the print target information of the T-shirt F.

After that, the control circuit 404 of the server 400 transmits the job number and the tag ID registered as shown at Step S70 to the operation terminal 100 through the network communication control portion 403 and the network NW. As a result, the control circuit 404 of the server 400 finishes this flow.

On the other hand, the control circuit 105 of the operation terminal 100 having received the job number and the tag ID from the server 400 transmits the received job number and tag ID and the print parameter information created at Step S30 to the reader/writer 200 via the inter-terminal radio communication as shown at Step S75.

The control circuit 105 of the operation terminal 100 transmits the job number and a corresponding print data such as an order number indicating a sequence of a placed order by a serial number, for example, and a request signal requesting production of the RFID tag Tc for customer to the apparatus 500 for producing an RFID tag through the network communication control portion 103 and the network NW as shown at step S80 and Step S85. As a result, the job number is written in the IC circuit part 150 of the RFID tag circuit element To, and the apparatus 500 for producing an RFID tag executes a production of the RFID tag Tc for customer on which the print data is printed on the surface (See FIG. 11, which will be described later).

At Step S90, the control circuit 105 of the operation terminal 100 determines if the production of the RFID tag Tc for customer has been finished or not on the basis of presence of input of a production completion signal from the apparatus 500 for producing an RFID tag. This step is repeated till the production of the RFID tag Tc for customer is completed, and if the production is completed, the determination is satisfied, and the routine goes to the subsequent Step S95.

At Step S95, the control circuit 105 of the operation terminal 100 outputs a display signal to the display portion 101. The display portion 101 makes a display requesting the operator as a customer to wait till the printed T-shirt F is completed. For example, the display portion 101 displays "take waiting card as RFID tag Tc for customer, and wait for a moment till completion". After that, this flow is finished.

In the above, Step S35 constitutes a job information creating portion configured to create print job information on the basis of order information to a print target input by operation of an operator as described in each claim. Step S65 constitutes job registration portion configured to search a database on the basis of the print job information created by the job information creating portion of the operation terminal, to give job identification information in association with the print job information to product identification information of the corresponding print target, and to store at least the job identification information and the product identification information among print parameter information and job identification information in the database together with tag identification information of the corresponding RFID tag for print target.

Also, Step S30 constitutes a parameter information creating portion configured to create print parameter information in the printing device corresponding to order information.

FIG. 9 is a view illustrating an example of a selection input screen of the print parameters displayed on the display portion of the operation terminal 100 at Step S30.

In the example shown in FIG. 9, in the selection input screen 110 of the print parameters, a job comment, a print size, a print media color, contrast, ON or OFF of double typing mode, ink volume, ON or OFF of yellow priority printing mode can be set.

In an input column 111 for the job comment, the operator can input an arbitrary character string using the operation portion 102. The input job comment is displayed on the display 41 of the above-described operation panel 40 when print is applied to the T-shirt F in the printing device 300.

The print size is a size of a print area on the T-shirt F, and a plurality of sizes is set in advance. The operator can select a desired size from a pull-down menu in a print size input column 112. The print media color is a color of the T-shirt F, that is, ground color of the T-shirt. The operator can select a desired color such as white, pink, yellow, blue, gray from the pull-down menu in a print media color input column 113.

The contrast can be set in five stages in this example, and the larger the numeral is, the darker the print becomes. The operator can set a desired contrast by sliding a slider 114. The double typing mode is a mode selected when the operator desires a darker density than that of a single typing, and ON or OFF of the double typing mode can be switched by presence of a check in a check box 115.

The ink volume is an ink total volume regulated value and can be set in ten stages in this example. The operator can set a desired total volume regulated value by sliding a slider 116. Other than the ink volume, an ink type such as special ink, for example may be able to be input, for example.

The yellow priority printing mode is a mode in which yellow (Y) is printed first and the other cyan (C), magenta (M), and black (K) are printed later and is a mode executed in order to prevent black ink from scattering in yellow if an image with yellow and black adjacent to each other is printed. The operator can switch ON or OFF of the yellow priority printing mode by presence of a check in a check box 117.

If an OK button 118 is pressed after the above settings have been made, selection and input of the print parameter are completed. Namely, the determination at Step S30 in FIG. 8 is satisfied. Therefore, the print parameter information created at Step S30 includes setting information of the job comment, print size, print media color, contrast, ON or OFF of double typing mode, ink volume, and ON or OFF of yellow priority printing mode. In other words, the print parameter information created at Step S30 includes printed color information by the printing device 300 corresponding to color information of the T-shirt F as the print target. The print parameter information corresponds to print condition information described in each claim.

FIG. 10 conceptually illustrates a job table registered in the stock database 401 by the control circuit 404 of the server 400 at Step S65.

As shown in FIG. 10, the job table comprises the job number, tag ID, product number that identifies T-shirt F, and print job information. The print job information includes the image number and information such as size, type and color as print target information of the T-shirt F. As the print target information, material, thickness, ink absorbing degree or repelling degree of the T-shirt F may be included other than the above. Also, the print job information such as order date, customer number that identifies a customer or operation terminal number that identifies an operation terminal, for example, may include information other than the above.

FIG. 11 is a flowchart illustrating a control procedure executed by the control circuit 510 of the apparatus 500 for producing an RFID tag when the apparatus 500 for producing an RFID tag having received a production request signal transmitted from the control circuit 105 of the operation terminal 100 at Step S80 and Step S85 produces the RFID tag Tc for customer.

First, at Step S110, the control circuit 510 determines if a production request signal including print data and writing data of the RFID tag Tc for customer has been received from the control circuit 105 of the operation terminal 100 through the network NW and the network communication control portion 509 or not. This step is repeated till the production request signal is received from the operation terminal 100, and if received, the determination is satisfied and the routine goes to Step S120.

At step S120, the control circuit 510 applies a print on a desired print area of the tag tape 503 by the print head 505 on the basis of the print data received from the operation terminal 100 at Step S110. Also, access information is created by the radio frequency circuit 502 and transmitted to the RFID tag circuit element To through the apparatus antenna 501, and the writing data as job number is written in the IC circuit part 150.

At Step S130, the control circuit 510 determines if printing and information writing executed at Step S130 has been normally finished or not. The determination on whether the information writing has been normally finished or not is, for example, made specifically by creating access information corresponding to a confirmation signal confirming contents of the IC circuit part 150 of the RFID tag circuit element To by the radio frequency circuit 502, transmitting it to the RFID tag circuit element To through the apparatus antenna 501, and determining if the writing of the writing data has been normally completed or not on the basis of a reply signal transmitted from the RFID tag circuit element To as the writing target in response to that. If the printing and information writing has not been normally finished, the routine goes to Step S140. Then, the control circuit 510 transmits a control signal to the control circuit 105 of the operation terminal 100 through the network communication control portion 509 and the network NW and executes error processing to have the display portion 101 make a display of that fact, such as “Printing has not been normally finished”, “Tag writing has not been normally finished”, for example. After that, this flow is finished. On the other hand, if the printing and information writing has been normally finished, the routine goes to Step S150.

At Step S150, the control circuit 510 cuts the tag tape 503 by the cutter 507. As a result, the writing data as job number is written in the IC circuit part 150 of the RFID tag circuit element To and the RFID tag Tc for customer on which a print corresponding to the print data is applied on a print area is produced.

At Step S160, the control circuit 510 transmits a production completion signal to notify a fact that the production of the RFID tag Tc for customer has been completed to the control circuit 105 of the operation terminal 100 through the network communication control portion 509 and the network NW. Then, this flow is finished.

FIG. 12 is a flowchart illustrating a control procedure executed by the control circuit 206 of the reader/writer 200 when the operator searches the T-shirt F using the reader/writer 200. This flow is started when the operator inputs a search start command through the operation portion 202 of the reader/writer 200.

First, at Step S205, the control circuit 206 outputs a control signal to the inter-terminal communication control portion 205, and the job number, tag ID and sewing parameter information transmitted from the control circuit 105 of the operation terminal 100 at Step S75 are received via inter-terminal radio communication.

First, at Step S210, the control circuit 206 outputs a control signal to the radio frequency circuit 204 and transmits an interrogation wave applied with predetermined modulation to the RFID tag circuit element To present in a communication area through the reader antenna 203 as a signal, that is, Read command signal in this example, to read data recorded in a memory part (not shown) of the RFID tag circuit element To by specifying the tag ID received from the operation terminal 100 received at Step S205.

At Step S220, the control circuit 206 determines if a reply signal has been received from the RFID tag circuit element To in the communication area in response to the Read command signal. If it is not the T-shirt F to be searched, the reply signal is not received, and the determination is not satisfied and the routine returns to Step S210. On the other hand, if it is the T-shirt F to be searched, the reply signal is received, and the determination is satisfied and the routine goes to Step S240.

At Step S240, the control circuit 206 outputs a display signal to the display portion 201 so as to make a display such as “The print target is this T-shirt”, for example for notifying that the T-shirt F matching the print target information input by the operator (See Step S25 in FIG. 8 above) has been detected.

At Step S250, the control circuit 206 outputs a control signal to the radio frequency circuit 204, transmits an interrogation wave applied with predetermined modulation to the RFID tag circuit element To as information writing target through the reader antenna 203 and write the information as a signal, that is, Write command signal in this example, to write desired data as job number and print parameter information in the memory part of an applicable RFID tag circuit element To by specifying the tag ID received at Step S205.

After that, at Step S260, the control circuit 206 outputs a control signal to the radio frequency circuit 204 and transmits an interrogation wave applied with predetermined modulation to the RFID tag circuit element To as the information writing target through the reader antenna 203 as a signal, that is, Read command signal in this example, to read data recorded in the memory part of the applicable RFID tag circuit element To by specifying the tag ID received at Step S205 and prompts a reply. After that, at Step S270, the control circuit 206 receives a reply signal transmitted from the RFID tag circuit element To as the writing target through the reader antenna 203 in response to the Read command signal.

Subsequently, at Step S280, the control circuit 206 confirms the information stored in the memory part of the RFID tag circuit element To on the basis of the received reply signal and determines if the above-described transmitted predetermined information as job number and print parameter information has been normally stored in the memory part or not using a known error detection code, that is, Cyclic Redundancy Check (CRC) code. If the information writing has not been successful, the determination is not satisfied and the routine returns to the preceding Step S250. On the other hand, if the information writing has been successful, the determination is satisfied and the routine goes to Step S290.

At Step S290, the control circuit 206 outputs a display signal to the display portion 201. Thus, the display portion 201 makes a display such as "Writing has been normally finished", for example, so as to notify that the information writing in the RFID tag circuit element To of the RFID tag Tf for T-shirt has been normally finished. Then, this flow is finished.

In the above, the job number and the print parameter information written and stored in the memory part of the IC circuit part 150 in the RFID tag circuit element To of the RFID tag Tf for T-shirt corresponds to print related information including print condition information stored in the RFID tag for print target described in each claim. Also, Step S205 constitutes a first information obtainment portion configured to obtain at least job identification information and tag identification information of the RFID tag for print target relating to the print target corresponding to the order information among the print parameter information created by the parameter information creating portion of the operation terminal and the job identification information associated by the job registration portion of the server.

Also, Step S210 and Step S220 constitute an information reading portion configured to read information from the specified RFID tag for print target through radio communication for search by specifying the tag identification information obtained by the first information obtainment portion, and Step S250, Step S260, Step S270, and Step S280 constitute an information writing portion configured to write at least the job identification information among the print parameter information and the job identification information corresponding to the tag identification information in the RFID tag for print target from which information is read by the information reading portion.

FIG. 13 is a flowchart illustrating control contents executed by the control circuit 80 of the printing device 300 and the control circuit 404 of the server 400.

At Step S305, the control circuit 80 outputs a control signal to the radio frequency circuit 92 and transmits an interrogation wave applied with predetermined modulation to the RFID tag circuit element To present in the communication area through the printer antenna 23 as an inquiry signal, that is, tag ID reading command signal in this example, to obtain a tag ID stored in the RFID tag circuit element To of the RFID tag Tf for T-shirt.

At Step S310, the control circuit 80 determines if the tag ID has been read or not on the basis of a reply signal received from the RFID tag circuit element To in the communication area in response to the tag ID reading command signal. If the operator has not attached the T-shirt F on the platen 20 of the printing device 300, the reply signal is not received, and the determination is not satisfied and the routine returns to Step S305. On the other hand, if the operator has attached the T-shirt F on the platen 20, the reply signal is received, and the determination is satisfied and the routine goes to Step S315.

At Step S315, the control circuit 80 reads the job number and the print parameter information stored in the RFID tag circuit element To of the RFID tag Tf for T-shirt by specifying the read tag ID. That is, an interrogation wave applied with predetermined modulation as a signal, that is, Read command signal, to read data recorded in the memory part of the RFID tag Tf for T-shirt is transmitted to the RFID tag circuit element To to be read through the printer antenna 23 by specifying the read tag ID, and a reply is prompted. After that, the reply signal transmitted from the RFID tag circuit element To to be read in response to the signal is received through the printer antenna 23, and the job number and the print parameter information are obtained on the basis of the reply signal.

At Step S320, the control circuit 80 transmits the obtained job number to the server 400 through the network NW.

The control circuit 404 of the server 400 having received the job number refers to a job table stored in the stock database 401, as shown at Step S325, and reads out an image number corresponding to the job number received from the printing device 300 (See FIG. 10). Then, image data corresponding to the image number is read from the image database 402. At Step S330, the control circuit 404 transmits the image data to the printing device 300 through the network NW.

The control circuit 80 of the printing device 300 having received the image data from the server 400 sets, at Step S335, the print parameter on the basis of the print parameter information obtained at Step S315 and starts printing of the image data on the T-shirt F. At this time, the control circuit 80 moves the platen 20 in a longitudinal direction as described above and moves the ink jet head 6 in a lateral direction at the same time so that the ink jet head 6 is relatively and freely moved longitudinally and laterally with respect to the T-shirt F and desired printing is applied at a desired position. The print on the T-shirt F is, as described above, executed after the operator sets the T-shirt F on the platen 20 and then, the platen 20 is moved to a desired print start position automatically or by manual operation.

At Step S340, the control circuit 80 determines if the printing on the T-shirt F has been finished or not. This step is repeated till the printing is finished, and when the printing is finished, the determination is satisfied and the routine goes to the subsequent Step S345.

At Step S345, the control circuit 80 transmits a notification signal to notify the job number and a fact that the printing is completed to the server 400 through the network NW. After that, at Step S350, the control circuit 80 moves the platen 20 to a detachment position. As a result, the operator can remove the printed T-shirt F on which the printing has been completed from the platen 20. Then, this flow is finished.

On the other hand, the control circuit 404 of the server 400 having received the job number and the print completion notification signal from the printing device 300 sets the tag ID corresponding to the received job number to used by referring to the job table stored in the stock database 401. Moreover, at Step S360, the control circuit 404 deletes the print job information corresponding to the job number received from the job table. Then, this flow is finished.

In the above, Step S315 constitutes an information obtainment portion configured to obtain print related information including at least one of the print target information, print condition information, and process information stored in the RFID tag for print target through the printer antenna and also constitutes a second information obtainment portion configured to obtain at least job identification information among the print parameter information and job identification information stored in the RFID tag for print target via radio communication described in each claim. Also, Step S335 constitutes a print processing portion configured to perform desired printing on a print target using the print parameter according to the print related information obtained by the information obtainment portion and also constitutes a print processing portion configured to print image information obtained by an image obtainment portion on a print target using the print parameter according to the print parameter information obtained by the second information obtainment portion or image obtainment portion. Also, Step S305, Step S310, Step S315, and Step S335 constitute a coordination control portion configured to control the information obtainment portion and the print processing portion in coordination so that if the obtainment of the print related information from the RFID tag for print target by the information obtainment portion is completed, the printing on the print target by the print processing portion is started accordingly.

Though not particularly shown as a procedure in the above flow, a procedure to receive image data transmitted from the server 400 before Step S335 constitutes the image obtainment portion configured to obtain at least image information from the server among the image information and the print parameter information corresponding to the job identification information obtained by the second information obtainment portion.

FIG. 14 is a flowchart illustrating a control procedure executed by the control circuit 206 of the reader/writer 200 when the printed T-shirt F is delivered to the customer. This flow is started when a start command of delivery processing is input by the operator through the operation portion 202 of the reader/writer 200.

At Step S410, the control circuit 206 outputs a control signal to the radio frequency circuit 204 and transmits an interrogation wave applied with predetermined modulation as an inquiry signal, that is, tag ID reading command signal in this example, to obtain the tag ID stored in the RFID tag circuit element To of the RFID tag Tc for customer to the RFID tag circuit element To present in the communication area through the reader antenna 203.

At Step S420, the control circuit 206 determines if the tag ID has been read or not on the basis of the reply signal received from the RFID tag circuit element To in the communication area in response to the tag ID reading command signal. If not normally read, the determination is not satisfied and the routine returns to Step S410. If normally read, the determination is satisfied and the routine goes to Step S430.

At Step S430, the control circuit 206 specifies the read tag ID and reads the job number stored in the RFID tag circuit element To of the RFID tag Tc for customer. That is, an interrogation wave applied with predetermined modulation is transmitted to the RFID tag circuit element To as the reading target through the reader antenna 203 as a signal, that is, Read command signal, to read the data stored in the memory part of the RFID tag Tc for customer by specifying the read tag ID, and a reply is prompted. After that, a reply signal transmitted from the RFID tag circuit element To as the reading target in response to the signal is received through the reader antenna 203, and the job number is obtained on the basis of the reply signal.

From Step S440 to Step S460, the control circuit 206 carries out procedure similar to that from Step S410 to Step S430 to the RFID tag Tf for T-shirt. That is, an inquiry signal to obtain the tag ID stored in the RFID tag circuit element To of the RFID tag Tf for T-shirt is transmitted through the reader antenna 203, and on the basis of a reply signal received in response to that, the tag ID is read. Then, the read tag ID is specified, and the job number stored in the RFID tag circuit element To of the RFID tag Tf for T-shirt is read.

At Step S470, the control circuit 206 determines if the job numbers read from the RFID tag Tc for customer and the RFID tag Tf for T-shirt at Step S430 and Step S460 match each other or not. If matched, the determination is satisfied and the routine goes to Step S480, where the control circuit 206 outputs a display signal to the display portion 201 and makes a display such as "This is the T-shirt you ordered" for example, to notify that the job numbers match each other. Then, this flow is finished. On the other hand, if the job numbers do not match at Step S470, the determination is not satisfied and the routine goes to Step S490, where the control circuit 206 outputs a display signal to the display portion 201 and makes a display such as "This is not the T-shirt you ordered" for example, to notify that the job numbers do not match. Then, this flow is finished.

In the above, the information reading and check are carried out from the RFID tag Tc for customer held by the customer and the RFID tag Tf for T-shirt provided at the T-shirt-F using the reader/writer 200, but the information reading and check may be carried out by a reader for delivery provided separately.

In the embodiment described above, the RFID tag Tf for T-shirt is provided at each T-shirt F in advance. If an operator searches, that is, selects, the T-shirt F corresponding to an order of a customer in order to carry out printing by the printing device 300, by specifying the tag ID and conducting radio communication by the reader/writer 200 on the basis of the tag ID of the RFID tag Tf for T-shirt, it can be found out easily and reliably. Also, at this time, the print parameter information according to the order contents of the customer is written in the RFID tag Tf for T-shirt found out by the reader/writer 200.

The printing device 300 is provided with the radio frequency circuit 92 and the printer antenna 23 for radio communication with the RFID tag Tf for T-shirt provided at the T-shift F. As a result, the control circuit 80 of the printing device 300 can obtain the print parameter information stored in the RFID tag circuit element To of the RFID tag Tf for T-shift through the printer antenna 23 via radio communication. Then, using the print parameter according to the obtained print parameter information, printing is applied on the T-shirt F. As a result, the printing can be applied on the T-shirt F in a mode such as print size or contrast for example in conformity to the order contents of the customer, and the printed T-shirt F as a product can be completed. As described above, the printing on the T-shirt F in conformity to the order contents of the customer can be executed reliably and efficiently utilizing the RFID tag Tf for T-shirt as information medium and also, a course from selection of the T-shirt F to the printing on the T-shirt F can be managed collectively in a centralized manner.

Also, particularly in this embodiment, in the printing device 300, when the information reading from the RFID tag Tf for T-shirt provided at the T-shirt F is completed, the printing on the T-shirt F is started accordingly. As a result, if the information reading from the RFID tag Tf for T-shirt is finished, the printing on the T-shirt can be automatically started without a special operation such as print instruction by the operator. Also, as a result, if the printing is to be started manually by the operator, nonconformity such as non-execution of printing since the operator forgets the manual operation or occurrence of a blank time can be avoided.

Also, particularly in this embodiment, the print parameter information created by the control circuit 105 of the operation terminal 100 includes print color information in the printing device 300 corresponding to the color information, that is, print media color, of the T-shirt F as a print target. As a result, selection of the color of the T-shirt F according to the order contents of the customer and setting of the print color to the selected T-shirt F can be executed reliably, and the printing according to the setting can be carried out by the printing device 300. Therefore, a variety of orders by customers relating to the T-shirt color and print color can be handled.

Also, particularly in this embodiment, if the job number is created by the server 400, the job number is transmitted to the apparatus 500 for producing an RFID tag through the operation terminal 100, and the RFID tag Tc for customer storing the job number is produced by the apparatus 500 for producing an RFID tag. As a result, the customer can use the RFID tag Tc for customer as a coupon and can redeem it for the corresponding printed T-shirt F by taking the RFID tag Tc for customer storing the job number with him or her to the shop when the printed T-shirt F desired by the customer on the basis of the job number is completed.

Also, particularly in this embodiment, when redeeming for the printed T-shirt F, the job number is obtained from the RFID tag Te for customer by the reader/writer 200, and the job number is also obtained from the RFID Tf for T-shirt. Then, the two job numbers are collated, and according to the result if the job numbers match each other or not, a corresponding notification, that is, display, is made. As a result, since the printed T-shirt F can be reliably delivered to a legitimate person entitled to the T-shirt without an error by using the RFID tag Tc for customer as a coupon, reliable transactions can be realized.

The present invention is not limited to the above embodiments but is capable of various modifications within a scope without departing from a gist and technical idea thereof. Such variations will be described below in order.

(1) When the Print Parameter is not to be Written in the Tag:

In the above embodiment, the print parameter information has been written in the RFID tag Tf for T-shirt by the reader/writer 200, and the print parameter information is read from the RFID tag Tf for T-shirt at printing and the printing of the image data is executed by the printing device 300, but not limited to that. That is, the print parameter information may be registered in the stock database 401 of the server 400, and the print parameter information may be read from the stock database 401 on the basis of the job number read from the RFID tag Tf for T-shirt at the printing so that the image data can be printed by the printing device 300.

FIG. 15 is a flowchart illustrating control contents executed by the control circuit 105 of the operation terminal 100 and the control circuit 404 of the server 400 and corresponds to the above-described FIG. 8. The same reference numerals are given to procedures similar to those in FIG. 8, and a description will be omitted.

Step S5 to Step S30 are the same as those in the above-described FIG. 8. At a subsequent Step S35A, the control circuit 105 of the operation terminal 100 creates the print job information included in the image number information created at Step S20 and the print target information created at Step S25 and transmits the print job information, a request signal requesting registration of the print job and the print parameter information created at Step S30 to the server 400 through the network communication control portion 103 and the network NW.

Step S40 to Step S65 are the same as those in the above-described FIG. 8. At a subsequent Step S67, the control circuit 404 of the server 400 registers the product number, print job information, job number, and tag ID registered in the job table in association with one another at Step S65 in the job table stored in the stock database 401 in association with the corresponding print parameter information received from the operation terminal 100.

Step S70 is the same as that in the above-described FIG. 8, and the registered job number and tag ID are transmitted to the operation terminal 100 through the network communication control portion 403 and the network NW. The control circuit 105 of the operation terminal 100 having received the job number and tag ID transmits the received job number and tag ID to the reader/writer 200 via the inter-terminal radio communication as shown at Step S75A. Here, unlike the above embodiment, the print parameter information is not transmitted to the reader/writer 200.

The subsequent Step S80 to Step S95 are the same as those in the above-described FIG. 8. In the above, Step S65 and Step S67 constitute a job registration portion configured to search the database on the basis of the print job information created by the job information creating portion of the operation terminal, to give the job identification information in association with the print job information to the product identification information of the corresponding print target, and to store at least the job identification information and the product identification information among the print parameter information and the job identification information in the database together with the tag identification information of the corresponding RFID tag for print target.

FIG. 16 conceptually illustrates a job table registered in the stock database 401 by the control circuit 404 of the server 400 at Step S65 and Step S67 and corresponds to the above-described FIG. 10.

As shown in FIG. 16, the job table is included in the job number, tag ID, product number that identifies T-shirt F, print job information, and print parameter information. The print parameter information includes, as described above, setting information on the job comment, print size, print media color, contrast, ON or OFF of double typing mode, ink volume, ON or OFF of the yellow priority printing mode.

FIG. 17 is a flowchart illustrating control contents executed by the control circuit 80 of the printing device 300 and the control circuit 404 of the server 400 in this variation and corresponds to the above-described FIG. 13. The same reference numerals are given to procedures similar to those in FIG. 13, and a description will be omitted.

Step S305 and Step S310 are the same as those in the above-described FIG. 13, and the control circuit 80 transmits an inquiry signal to the RFID tag circuit element To of the RFID tag Tf for T-shirt and determines if the tag ID has been read or not on the basis of a reply signal received from the RFID tag circuit element To in response to that. If the tag ID has been read, the routine goes to Step S315A.

At Step S315A, the control circuit 80 specifies the read tag ID and reads the job number stored in the RFID tag circuit element To of the RFID tag Tf for T-shirt. In this variation, the job number stored in the RFID tag circuit element To of the RFID tag Tf for T-shirt corresponds to the print condition information and print related information described in each claim.

Step S320 is the same as that in the above-described FIG. 13, and the control circuit 80 transmits the obtained job number to the server 400 through the network NW.

The control circuit 404 of the server 400 having received the job number reads out the print parameter information corresponding to the job number received from the printing device 300 referring to the job table stored in the stock database 401 as shown at Step S325A. Also, the image number corresponding to the job number is read referring to the job table, and the image data corresponding to the image number is read from the image database 402. Then, at Step S330A, the control circuit 404 transmits the image data and print parameter information to the printing device 300 through the network NW.

As a result, the control circuit 80 of the printing device 300 having received the image data and print parameter information from the server 400 sets the print parameter on the basis of the print parameter information at Step S335 and starts printing of the image data on the T-shirt F. The subsequent Step S340 to Step S360 are the same as those in the above-described FIG. 13.

In the above, Step S315A constitutes an information obtainment portion configured to obtain print related information including at least one of the print target information, print condition information and process information stored in the RFID tag for print target through the printer antenna described in each claim and also constitutes a second information obtainment portion configured to obtain at least job identification information among the print parameter information and job identification information stored in the RFID tag for print target via radio communication. Also, Step S335 constitutes a print processing portion configured to perform desired printing on a print target using the print parameter according to the print related information obtained by the information obtainment portion and also constitutes a the print processing portion configured to print the image information obtained by the image obtainment portion on the print target using the print parameter according to the print parameter information obtained by the second information obtainment portion or image obtainment portion. Also, Step S305, Step S310, Step S315A, and Step S335 constitute a coordination control portion configured to control the information obtainment portion and the print processing portion in coordination so that when obtainment of the print related information from the RFID tag for print target by the information obtainment portion is completed, the printing on the print target by the print processing portion is started accordingly.

Though not particularly shown as a procedure in the above flow, a procedure to receive the image data and the print parameter transmitted from the server 400 before Step S335 constitutes an image obtainment portion configured to obtain at least image information among the image information and print parameter information corresponding to the job identification information obtained by the second information obtainment portion from the server.

According to the above-described variation, an effect similar to that of the above embodiment is obtained and moreover, a memory usage amount of the RFID tag Tf for T-shirt can be saved.

(2) Others:

In the above, at least the job number among the print parameter information as print condition information and the job number as the print condition information is written in the RFID tag circuit element To of the RFID tag Tf for T-shirt, but information other than those may be written in. For example, print target information corresponding to the attribute of the T-shirt F, print job information including the image data in that may be written in. Also, though not particularly shown in this embodiment, a post process such as a heat treatment and steam treatment might be carried out after the printing in the case of printing on a cloth such as a T-shirt. The process information relating to such a process including a pre process if any may be included.

In the above, in the apparatus 500 for producing an RFID tag, the case in which the RFID tag Tc for customer used as a coupon when a customer redeems it for a printed T-shirt F is produced is described as an example, but not limited to that. If the customer holds an IC card such as a credit card for example, storing identification information that can identify himself or herself, the customer may be identified using the identification information of the IC card, and the printed T-shirt F may be delivered according to the result.

Also, in the above, in the apparatus 500 for producing an RFID tag, the case in which the tag tape 103 for which the printing and an access such as writing in the above embodiment to the RFID tag circuit element To have been finished is cut by the cutter 107 so as to produce the RFID tag Tc for customer is described as an example, but not limited to that. That is, if a label mount such as a so-called die-cut label separated in advance to a predetermined size corresponding to the label is continuously arranged on a tape fed out of a roll, only the label mount with print is peeled off the tape after the tape is discharged from a carry-out exit so as to produce the RFID tag Tc for customer without cutting the tape with the cutter 107. The label with print has the accessed RFID tag circuit element To and the corresponding print has been applied on the label. Thus, the present invention may also be applied to such a case.

Also, in the above, when the RFID tag Tc for customer is to be produced, the RFID tag information as job number is written in the IC circuit part 150 of the RFID tag circuit element To and printing to identify the RFID tag according to desired print data is applied by the print head 505, but not limited to that. This printing does not necessarily have to be applied but the RFID tag Tc for customer may be produced only by writing of the RFID tag information as job number.

In the above, arrows shown in each figure such as FIGS. 2, 6 and 7 show an example of a flow of signals and do not limit a signal flow direction. Also, the flowcharts shown in such as FIGS. 8, 11 to 14 do not limit the present invention to the procedures shown in the above flows, but addition or deletion of procedures or change of the order are possible within a scope not departing from a gist and technical idea of the invention.

Also, other than the above-described, methods by the above embodiments and each variation may be combined as appropriate for use.

Though not individually exemplified, the present invention is put into practice with various changes in a range not departing from its gist.

What is claimed is:

1. A printing device configured to carry out radio communication with a radio frequency identification (RFID) tag for print target that is associated with at least a print target and stores tag identification information and job identification information by associating said print job information created on the basis of order information to said print target with product identification information of said print target, the printing device comprising:

a second information obtainment portion configured to obtain said job identification information stored in said RFID tag for print target via radio communication;

an image obtainment portion configured to obtain image information to be printed on said print target and print parameter information created on the basis of the order information to said print target from a database, corresponding to said job identification information obtained by said second information obtainment portion; and a print processing portion configured to print said image information obtained by said image obtainment portion on said print target using at least one print parameter according to said print parameter information obtained by said image obtainment portion.

2. A printing system comprising: a radio frequency identification (RFID) tag for print target associated with at least one print target; an operation terminal which an operator can operate for input; an apparatus for communicating with an RFID tag configured to read information with respect to said RFID tag for print target and connected to said operation terminal, capable of information input and output; a printing device configured to perform desired printing on said print target; and a server connected to said operation terminal and said printing device, capable of information input and output, said operation terminal including: a job information creating portion configured to create print job information on the basis of order information to said print target, input by operation of said operator;

and a parameter information creating portion configured to create print parameter information used by said printing device corresponding to said order information;

said server including: a database in which print target information including an attribute of said print target, tag identification information of said RFID tag for print target corresponding to said print target, and image information to be printed on said print target on the basis of said order information are stored in association with one another; and a job registration portion configured to search said database on the basis of said print job information created by said job information creating portion of said operation terminal, to give job identification information by associating said print job information with product identification information of corresponding said print target, and to store in said database at least said job identification information among said print parameter information and said job identification information, and said product identification information together with tag identification information of corresponding said RFID tag for print target; said apparatus including: a first information obtainment portion configured to obtain at least said job identification information among said print parameter information created by said parameter information creating portion of said operation terminal and said job identification information associated by said job registration portion of said server, and said tag identification information of said RFID tag for print target relating to said print target corresponding to said order information; an information reading portion configured to carry out radio communication for search by specifying said tag identification information obtained by said first information obtainment portion and to read information from said specified said RFID tag for print target; and an information writing portion configured to write at least said job identification information among said print parameter information and said job identification information corresponding to said tag identification information in said RFID tag for print target from which information reading is carried out by said information reading portion; and said printing device including: a second information obtainment portion configured to obtain at least said job identification information among said print parameter information and said job identification information stored in said RFID tag for print target via radio communication; an image obtainment portion configured to obtain at least said image information among said image information and said print parameter information from said server, corresponding to said job identification information obtained by said second information obtainment portion; and a print processing portion configured to print said image information obtained by said image obtainment portion on said print target using at least one print parameter according to said print parameter information obtained by said second information obtainment portion or said image obtainment portion.

3. The printing system according to claim 2, wherein: said parameter information creating portion of said operation terminal creates said print parameter information including print color information in said printing device corresponding to color information of said print target to be said print target on the basis of said order information.

4. The printing system according to claim 2, further comprising an apparatus for producing an RFID tag, including: a feeding device configured to feed a tag medium provided with an RFID tag circuit element having an IC circuit part storing information and a tag antenna for information transmission and reception; and an apparatus antenna configured to carry out radio communication with said RFID tag circuit element, and wherein: said apparatus writes said job identification information in said IC circuit part of said RFID tag circuit element provided at said tag medium fed by said feeding device so as to produce an RFID tag for customer.

5. A printing device configured to carry out radio communication with a radio frequency identification (RFID) tag for print target that is associated with at least a print target and stores tag identification information, job identification information by associating said print job information created on the basis of order information to said print target with product identification information of said print target, and print parameter information created on the basis of order information to said print target, the printing device comprising:

a second information obtainment portion configured to obtain said print parameter information and said job identification information stored in said RFID tag for print target via radio communication;

an image obtainment portion configured to obtain image information to be printed on said print target from a database, corresponding to said job identification information obtained by said second information obtainment portion; and a print processing portion configured to print said image information obtained by said image obtainment portion on said print target using at least one print parameter according to said print parameter information obtained by said second information obtainment portion.

* * * * *